United States Patent
Wilson et al.

(10) Patent No.: US 11,016,209 B2
(45) Date of Patent: May 25, 2021

(54) ELECTROMAGNETIC RESERVOIR MONITORING SYSTEMS AND METHODS INCLUDING EARTH MODELING

(71) Applicant: Halliburton Energy Services, Inc., Houston, TX (US)

(72) Inventors: Glenn Andrew Wilson, Houston, TX (US); Burkay Donderici, Houston, TX (US); Ahmed Fouda, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 193 days.

(21) Appl. No.: 16/329,560

(22) PCT Filed: Sep. 28, 2016

(86) PCT No.: PCT/US2016/054201
§ 371 (c)(1),
(2) Date: Feb. 28, 2019

(87) PCT Pub. No.: WO2018/063195
PCT Pub. Date: Apr. 5, 2018

(65) Prior Publication Data
US 2019/0196039 A1 Jun. 27, 2019

(51) Int. Cl.
*G01V 3/30* (2006.01)
*G01V 1/28* (2006.01)
(Continued)

(52) U.S. Cl.
CPC .............. *G01V 1/282* (2013.01); *E21B 47/13* (2020.05); *G01V 1/28* (2013.01); *G01V 1/46* (2013.01);
(Continued)

(58) Field of Classification Search
CPC . G01V 1/282; G01V 1/50; G01V 3/30; G01V 3/34; G01V 11/002; G01V 2210/66
See application file for complete search history.

(56) References Cited

U.S. PATENT DOCUMENTS

| 6,534,986 B2 | 3/2003 | Nichols |
| 8,014,988 B2 | 9/2011 | Wahrmund et al. |

(Continued)

FOREIGN PATENT DOCUMENTS

| WO | 2007130205 | 11/2007 |
| WO | 2015076806 | 5/2015 |

OTHER PUBLICATIONS

Fouda et al., New Resistivity Models for Reservoir Monitoring Applications, Jul. 18-22, 2015, SPWLA 56th Annual Logging Symposium, 16 pp. (Year: 2015).*
(Continued)

*Primary Examiner* — Toan M Le
(74) *Attorney, Agent, or Firm* — Chamberlain Hrdlicka

(57) ABSTRACT

Systems and methods for electromagnetic reservoir monitoring with earth modeling. An electromagnetic (EM) monitoring system for a subterranean earth formation comprises a receiver locatable in a wellbore and responsive to EM radiation propagating through the formation. The receiver generates EM data associated with the formation. The system also comprises a processor that generates a reservoir model of the earth formation based on additional data associated with the formation; converts the reservoir model to a resistivity model of the formation; generates simulated EM data based on the resistivity model of the formation; compares the EM data and the simulated EM data; generates an updated resistivity model based on the comparison between the EM data and the simulated EM data; and
(Continued)

determines an operational parameter based on the updated resistivity model to manage production from a well.

20 Claims, 14 Drawing Sheets

(51) Int. Cl.
    *G01V 1/46*     (2006.01)
    *G01V 1/48*     (2006.01)
    *G01V 3/26*     (2006.01)
    *G01V 1/52*     (2006.01)
    *E21B 47/13*     (2012.01)
    *G01V 1/50*     (2006.01)
    *G01V 3/34*     (2006.01)
    *G01V 11/00*     (2006.01)

(52) U.S. Cl.
    CPC ............... *G01V 1/48* (2013.01); *G01V 1/50* (2013.01); *G01V 1/52* (2013.01); *G01V 3/26* (2013.01); *G01V 3/30* (2013.01); *G01V 3/34* (2013.01); *G01V 11/002* (2013.01); *G01V 11/00* (2013.01); *G01V 2210/66* (2013.01)

(56) References Cited

U.S. PATENT DOCUMENTS

| | | |
|---|---|---|
| 8,095,345 B2 | 1/2012 | Hoversten |
| 2003/0038634 A1 | 2/2003 | Strack |
| 2009/0043554 A1 | 2/2009 | Horne et al. |
| 2010/0271030 A1 | 10/2010 | Reiderman et al. |
| 2012/0223717 A1 | 9/2012 | LaBrecque |
| 2013/0297215 A1 | 11/2013 | Rondeleux |
| 2014/0257706 A1 | 9/2014 | Biterge et al. |
| 2016/0266269 A1 | 9/2016 | Wilson et al. |

OTHER PUBLICATIONS

International Search Report and Written Opinion of PCT Application No. PCT/US2016/054201 dated Jun. 20, 2017: pp. 1-17.

Black et al., "3D inversion of time-lapse CSEM data based on dynamic reservoir simulations of the Harding field, North Sea," SEG San Antonio Annual Meeting, 2011: pp. 44-48 (666-670).

Liang et al., "Joint inversion of controlled-source electromagnetic and production data for reservoir monitoring," Geophysics, Sepember-October, vol. 77(5), 2012: pp. !D9-!D22.

McGillivray et al., "Calculation of sensitivities for the frequency-domain electromagnetic problem," Geophys. J. Int. 1994, vol. 116: pp. 1-4.

Tøndel et al., "Reservoir monitoring in oil sands: Developing a permanent cross-well system," SEG San Antonio Annual Meeting, 2011: pp. 4077-4081.

Zhdanov, Chapters 1 and 2: "Forward and Inverse Problems in Geophysics," and "Ill-Posed Problems and the Methods of Their Solution," Methods in Geochemistry and Geophysics, 36, Geophysical Inverse Theory and Regularization Problems, Elsevier Science B.V., New York, 2002: pp. 3-57.

* cited by examiner

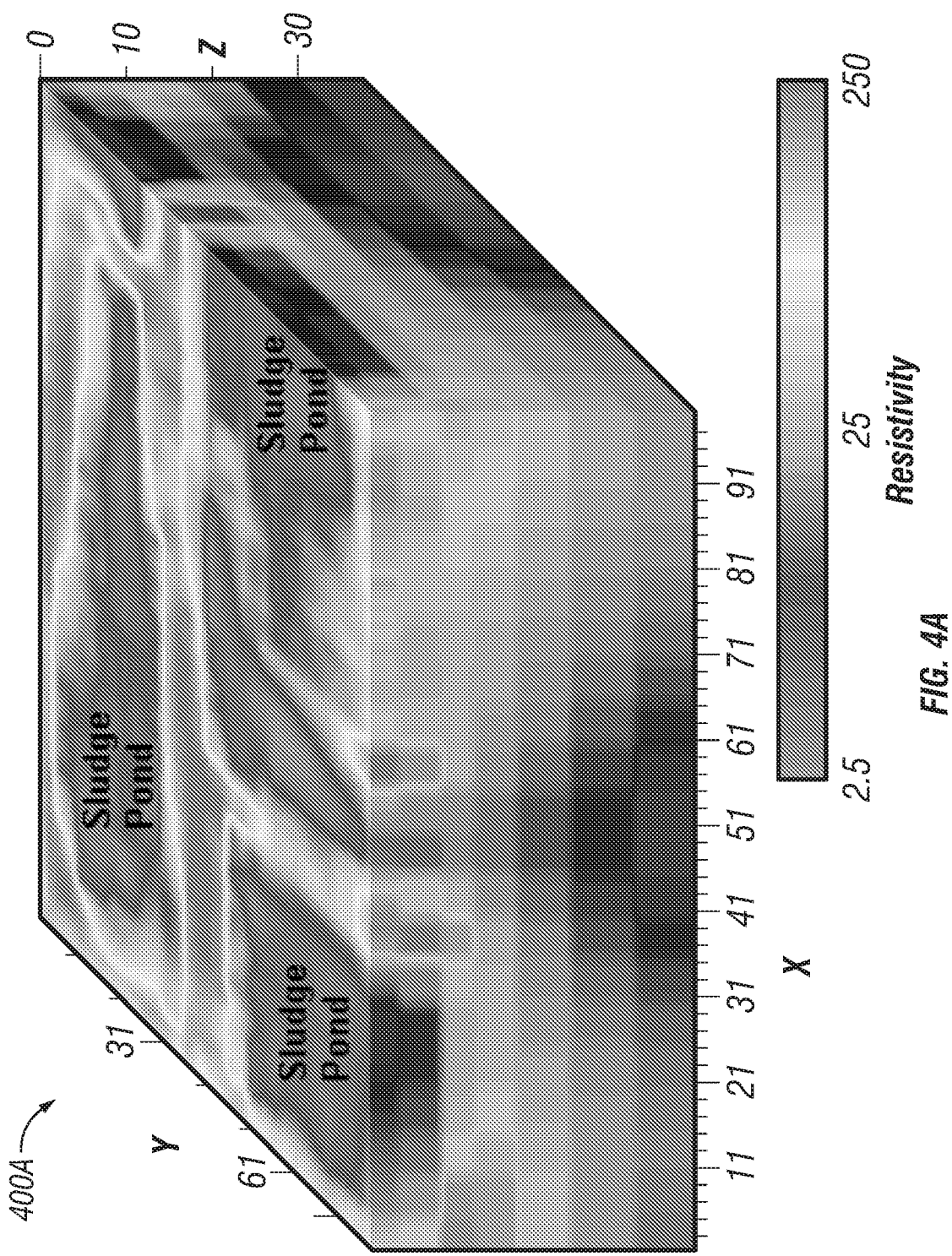

US 11,016,209 B2

ELECTROMAGNETIC RESERVOIR MONITORING SYSTEMS AND METHODS INCLUDING EARTH MODELING

CONTEXT

This section is intended to provide relevant contextual information to facilitate a better understanding of the various aspects of the described embodiments. Accordingly, it should be understood that these statements are to be read in this light and not as admissions of prior art.

During oil and gas exploration and production, many types of information are collected and analyzed. The information is used to determine the quantity and quality of hydrocarbons in a reservoir, and to develop or modify strategies for hydrocarbon production.

Decisions pertaining to reservoir management are made on the basis of earth models which can characterize production and subsurface uncertainty from a suite of probabilistic (e.g., P10, P50, P90) models populated with static data (e.g., reservoir structure), quasi-static data (e.g., time-lapse seismic attributes), and dynamic data (e.g., fluid saturation). Earth models are typically built from the geostatistical population of petrophysical data within structural models interpreted from seismic and well log data. Earth models evolve as static, quasi-static and dynamic data are acquired, interpreted, and integrated into the model. During production, subsurface uncertainty is decreased (i.e., the confidence of a particular suite of probabilistic models is increased) as dynamic reservoir simulations are history-matched with known fluid volumetrics.

An electromagnetic (EM) reservoir monitoring system installed in a production well can provide quasi-static (e.g., time-lapse EM measurements of the formation) and dynamic (e.g., fluid saturation) data that can be supplemented to earth modeling and reservoir management operations to minimize subsurface uncertainty so as to optimize production and/or injection practices and/or to advise of appropriate intervention strategies and practices in advance of unfavorable production scenarios. For example, reliably monitoring changes in fluid saturation due to waterflood during production can optimize the control of intelligent completions in both producing and injection wells.

DESCRIPTION OF THE DRAWINGS

For a detailed description of the embodiments, reference will now be made to the accompanying drawings in which.

DETAILED DESCRIPTION

This disclosure provides methods of modeling an earth formation using an EM monitoring system. Specifically, the disclosure provides a method of designing an EM monitoring system as well related methods of using the EM monitoring system to generate earth models.

Figure 1A:
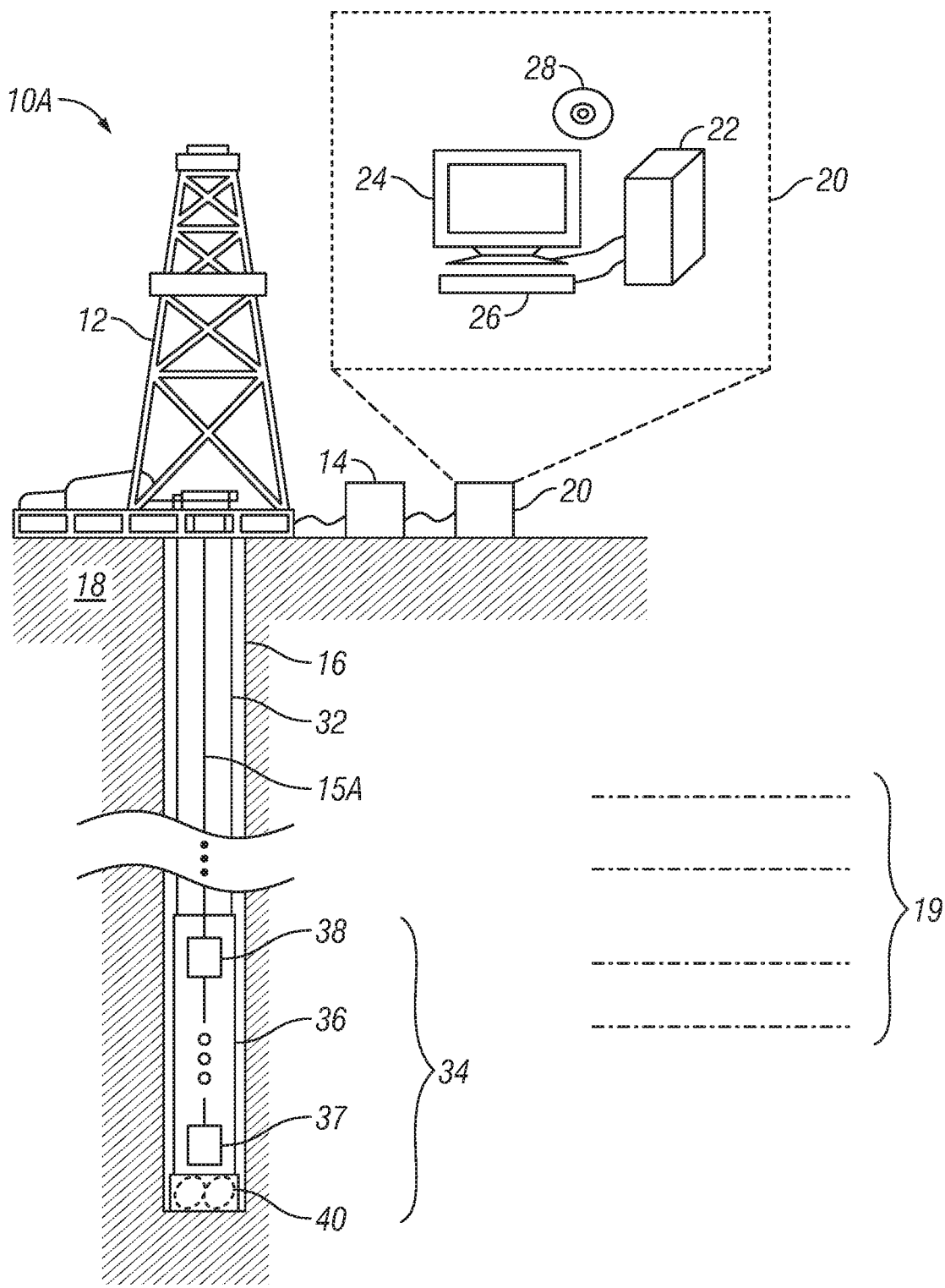
FIG. 1A shows a schematic view of a drilling system in accordance with one or more embodiments.
Figure 1B:
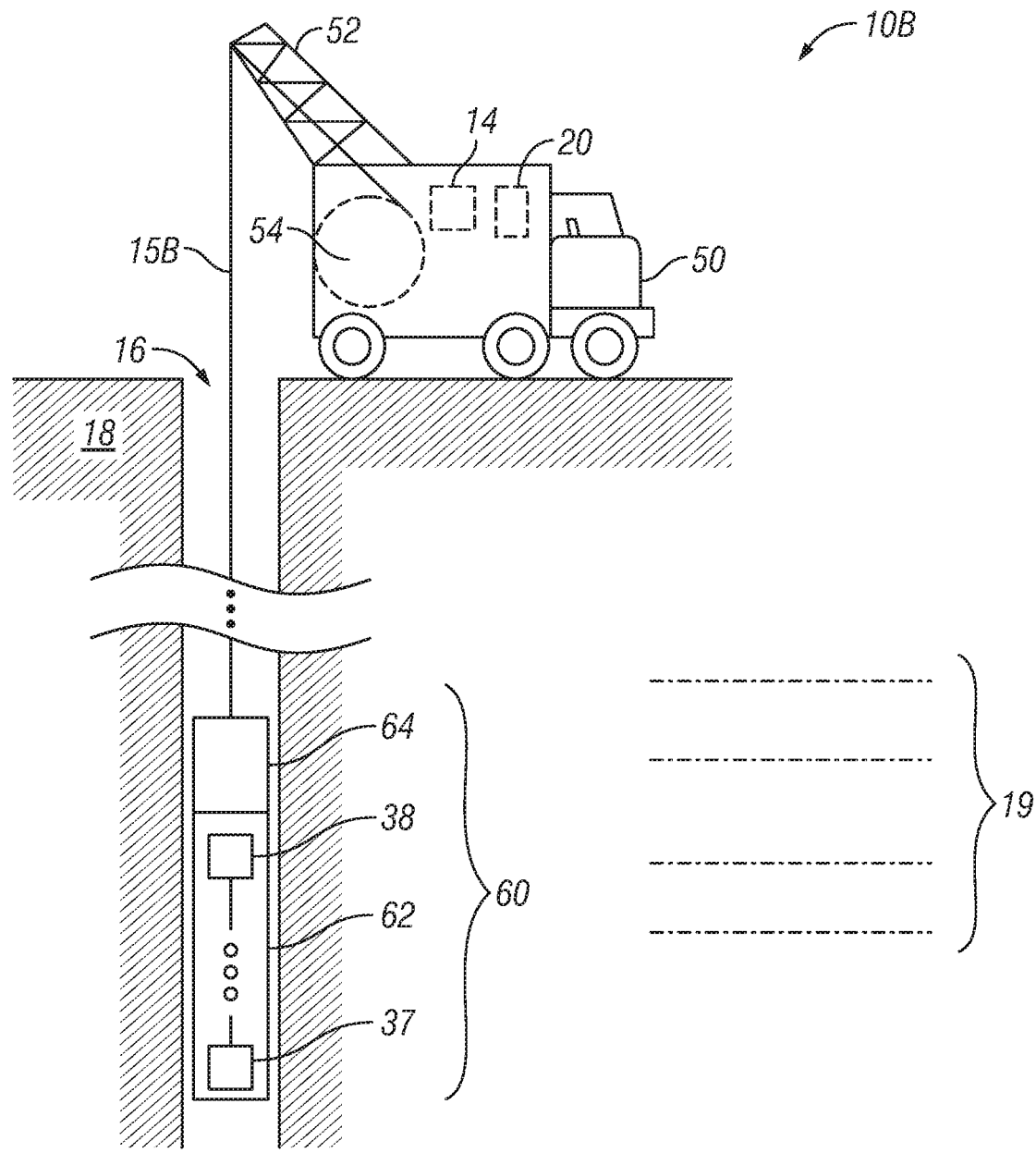
FIG. 1B shows a schematic view of a wireline logging system in accordance with one or more embodiments.
Figure 1C:
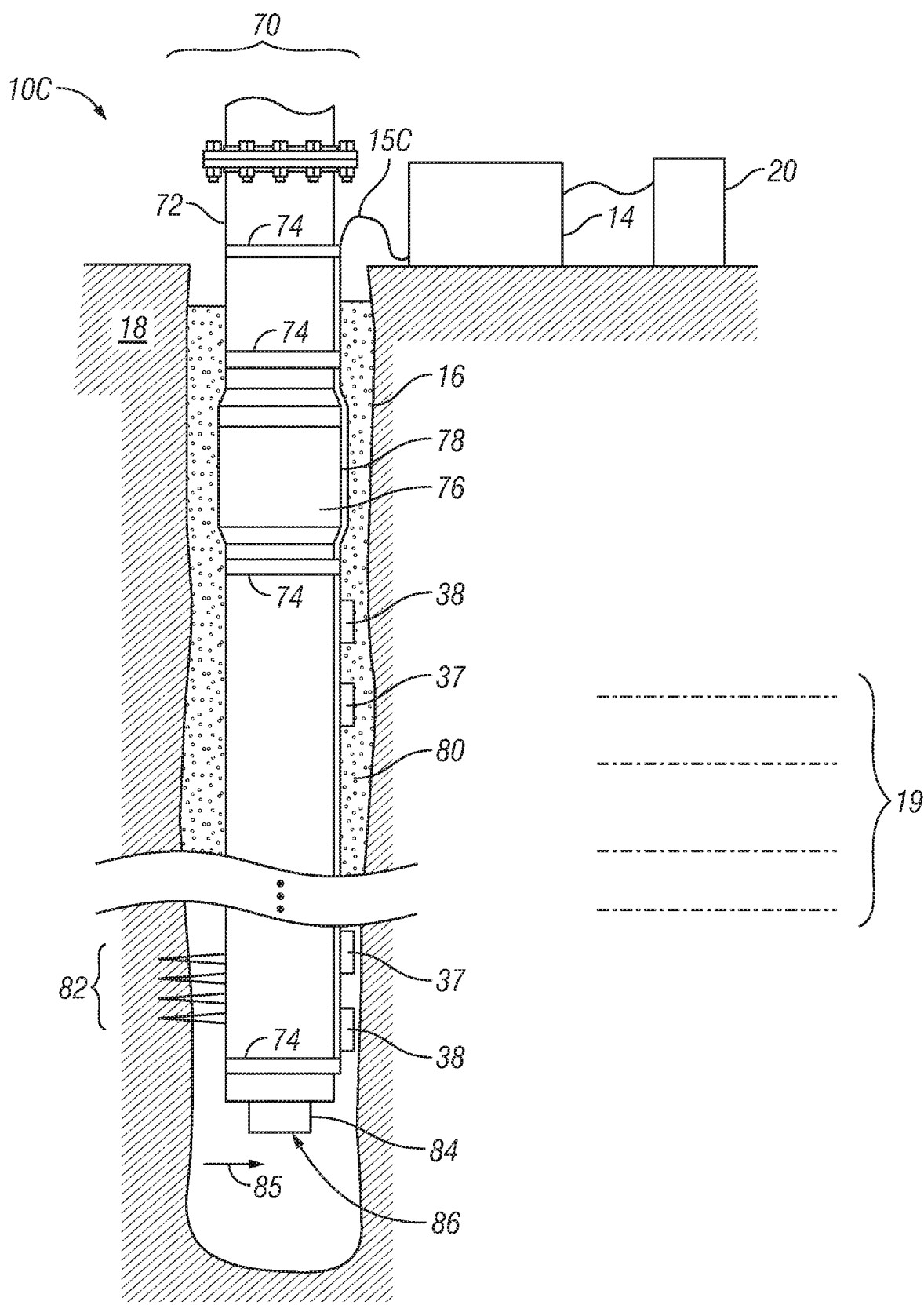
FIG. 1C shows a schematic view of an example electromagnetic reservoir monitoring system, according to one or more embodiments.

FIGS. 1A-1C show various well logging applications, according to one or more embodiments. As shown in FIG. 1A, a drilling assembly 12 enables a drill string 32 to be lowered and raised in a borehole 16 that penetrates subterranean formations 19 of the earth 18. At the lower end of the drill string 32, a bottomhole assembly 34 with a drill bit 40 removes material and penetrates formations 19 using known drilling techniques. The bottomhole assembly 34 also includes a logging tool 36 (e.g., a logging-while-drilling (LWD) or measurement-while-drilling (MWD) tool) with sensors 38 to obtain EM data and additional logging data associated with the formations 19 as further described herein.

The logging tool 36 may have EM sources 37 with transmitters for generating EM radiation in the formations 19. The sensors 38 may have a receiver for measuring the resistivity of the formations 19. The sensors 38 may monitor ambient EM fields rather than those emitted from the EM source(s) 37, such as magnetotelluric measurements. As non-limiting examples, the sensors 38 may include a gamma ray device for measuring formation gamma ray intensity, devices for measuring the inclination and azimuth of the drill string 32, pressure sensors for measuring drilling fluid and/or formation fluid pressure, temperature sensors for measuring wellbore temperature, geophones or accelerometers for taking seismic or microseismic measurements, etc.

The logging tool 36 may also include electronics for data storage, communication, etc. The measurements obtained by the sensor(s) 38 are transmitted to the surface and/or are stored by the logging tool 36. In either case, the measurements as a function of position and/or time may be analyzed to determine properties of the formations 19. For example, EM field measurements may be used to derive a resistivity log as a function of position, to track movement of downhole fluids, and/or other formation properties. The logs and/or formation properties may be displayed to an operator of the drilling assembly 12.

A cable 15A provides a communication path between the bottomhole assembly 34 and the surface. The cable 15A may take different forms and includes embedded electrical conductors and/or optical waveguides (e.g., optical fibers) to enable interrogation or monitoring of the sensors 38. Further, the cable 15A may enable transfer of power and/or communications between the bottomhole assembly 34 and the surface. For example, the EM source(s) 37 may be controlled and powered via the cable 15A. The cable 15A may be integrated with, attached to, or inside the drill string 32. The cable 15A may be supplemented by or replaced at least in part by wireless telemetry systems or other wireless communication techniques, such as mud pulse telemetry.

An interface 14 at the surface receives the measurements via cable 15A or another telemetry channel and conveys the measurements to a computer system 20. In some embodiments, the surface interface 14 and/or the computer system 20 may perform various operations such as converting received signals from one format to another, storing the measurements, processing the measurements, deriving logs from the measurements, and/or displaying logs or other measurement data. In at least some embodiments, the computer system 20 includes a processing unit 22 (e.g., a processor) that performs measurement analysis operations by executing software or instructions obtained from a local or remote non-transitory machine-readable medium 28. The processing unit 22 can be configured to perform the methods as described herein. The computer system 20 also may include input device(s) 26 (e.g., a keyboard, mouse, touchpad, etc.) and output device(s) 24 (e.g., a monitor, printer, etc.). Such input device(s) 26 and/or output device(s) 24 provide a user interface that enables an operator to interact with the logging tool 36 and/or software executed by the processing unit 22. For example, the computer system 20 may enable an operator to select measurement analysis options, to view collected measurements, to view analysis results, and/or to perform other tasks.

FIG. 1B shows a schematic view of a wireline logging survey environment 10B, in accordance with one or more embodiments. As shown, a wireline logging string 60 is suspended in the borehole 16 that penetrates formations 19 of the earth 18. For example, the wireline logging string 60 may be suspended by a cable 15B having conductors and/or optical fibers for conveying power to the wireline logging string 60. The cable 15B may also be used as a communication interface for uphole and/or downhole communications. For example, the sensor(s) 38 and EM source(s) 37 may be controlled and powered via the cable 15B. Further, the cable 15B enables monitoring or interrogation of the sensors 38. In at least some embodiments, the cable 15B wraps and unwraps as needed around cable reel 54 when lowering or raising the wireline logging string 60. As shown, the cable reel 54 may be part of a movable logging facility or vehicle 50 having a cable guide 52.

The wireline logging string 60 includes logging tool(s) 64 and a logging tool 62 with sensors 38 to obtain the EM data and additional logging data associated with the formations 19 as described herein. The logging string 60 may include sources 37 with transmitters for generating EM radiation in the formation 19. The sensors 38 may include a receiver for measuring formation resistivity, a gamma ray device for measuring formation gamma ray intensity, devices for measuring the inclination and azimuth of the drill string 32, pressure sensors for measuring drilling fluid pressure, temperature sensors for measuring wellbore temperature, geophones or accelerometers for taking seismic or microseismic measurements, etc.

The logging tool 62 may also include electronics for data storage, communication, etc. The measurements obtained by the sensor(s) 38 are conveyed to the surface and/or are stored by the logging tool 62. As previously noted, measurements as a function of position or time may be analyzed to determine formation properties as described herein. A surface interface 14 receives the measurements via the cable 15B and conveys the measurements to a computer system 20 for analysis.

FIG. 1C shows a schematic view of an electromagnetic (EM) reservoir monitoring system 10C, according to one or more embodiments. As shown, a well 70 is equipped with sensors 38 to obtain EM data and/or additional logging data associated with the formations 19 as described herein. The EM monitoring system 10C may include EM sources 37 with transmitters for generating EM radiation in the formations 19. The sensors 38 may include a receiver for measuring formation resistivity, a gamma ray device for measuring formation gamma ray intensity, devices for measuring the inclination and azimuth of the drill string 32, pressure sensors for measuring drilling fluid pressure, temperature sensors for measuring wellbore temperature, geophones or accelerometers for taking seismic or microseismic measurements, etc.

A drilling rig has been used to drill borehole 16 that penetrates formations 19 of the earth 18 in a typical manner (see e.g., FIG. 1A). Further, a casing string 72 is positioned in the borehole 16 and includes multiple tubular casing sections (usually about 40 feet long) connected end-to-end by couplings 76. It should be appreciated that FIG. 1C is not to scale, and that casing string 72 typically includes many such couplings 76. Further, the well 70 includes cement slurry 80 that has been injected and allowed to set in the annular space between the outer surface of the casing string 72 and the inner surface of the borehole 16. Further, a production tubing string 84 has been positioned in an inner bore of the casing string 72.

The well 70 corresponds to a production well and is adapted to guide a desired fluid (e.g., hydrocarbon fluids) from a bottom of the borehole 16 to a surface of the earth 18. Accordingly, perforations 82 may be formed at the bottom of the borehole 16 to facilitate the flow of a fluid 85 from a surrounding formation into the borehole 16 to the surface via an opening 86 at the bottom of the production tubing string 84. It should be appreciated that the well configuration of FIG. 1C is illustrative and not limiting on the scope of the disclosure. Other examples of permanent well installations include injection wells and monitoring wells.

A cable 15C having electrical conductors and/or optical fibers is used to enable monitoring or interrogation of the sensors 38. Further, the EM source(s) 37 may be controlled and powered via the cable 15C. As shown, the cable 15C extends along an outer surface of the casing string 72 and is held against the outer surface of the casing string 72 at spaced apart locations by multiple bands 74 that extend around the casing string 72. A protective covering 78 may be installed over the cable 15C at each of the couplings 76 of the casing string 72 to prevent the cable 15C from being pinched or sheared by the coupling's contact with the borehole wall. The protective covering 78 may be held in place, for example, by two of the bands 74 installed on either side of coupling 76. In at least some embodiments, the cable 15C terminates at surface interface 14, which conveys EM field measurements obtained from one or more of the magnetic induction sensors 38 to a computer system 20 for analysis.

It should be appreciated that the sensors 38 in FIGS. 1A-C may take electric field, magnetic field, temperature, pressure, microseismic, sonic, porosity, permeability, fluid saturation, porosity, grain size, grain orientation, and fluid resistivity measurements. As used herein, EM data refers to parameters relating to resistivity based on electric field and/or magnetic field measurements.

Figure 2:
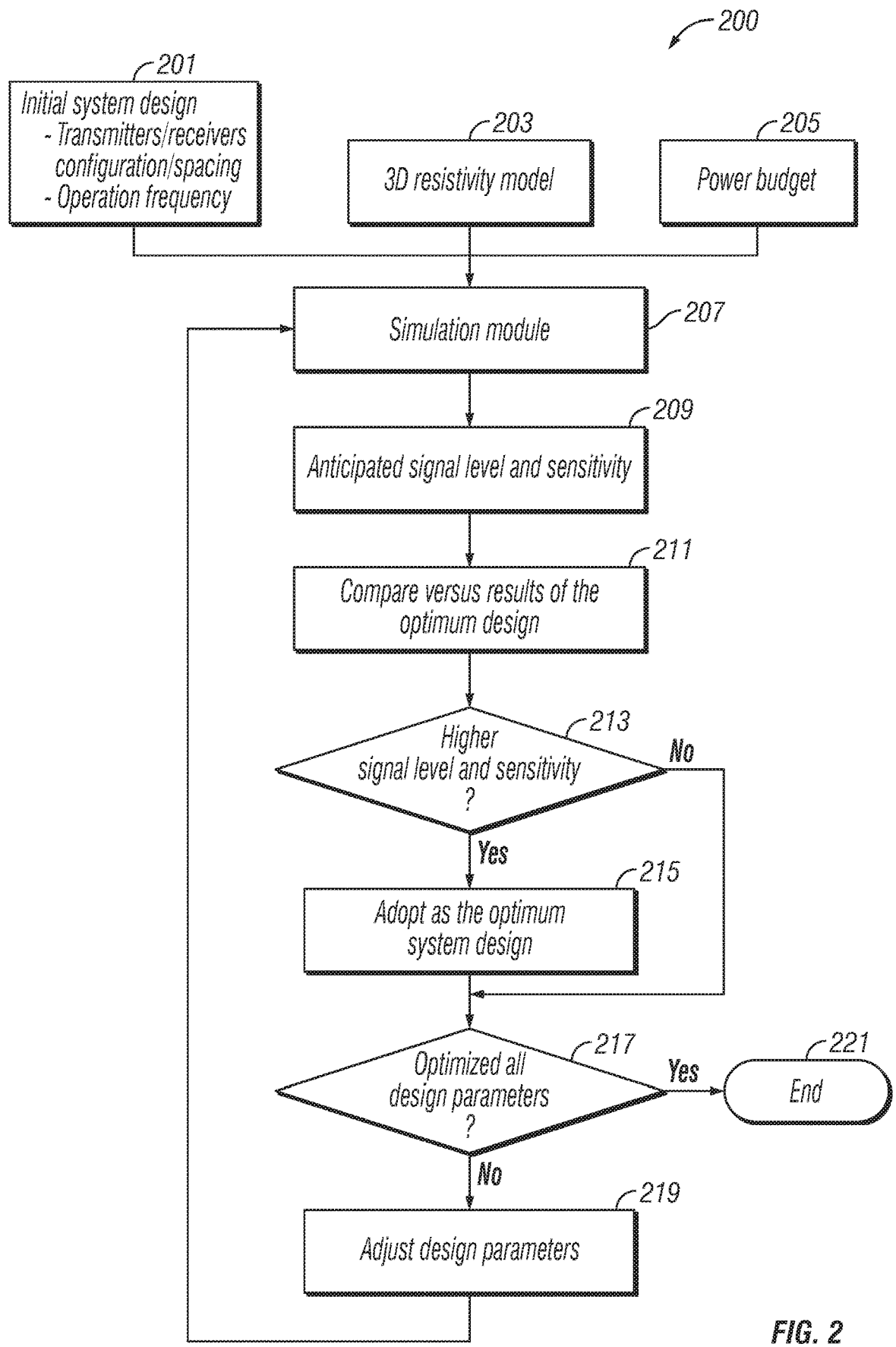
FIG. 2 shows a flowchart view of a method of optimizing a design and/or parameters of an EM monitoring system, according to one or more embodiments.
Figure 3:
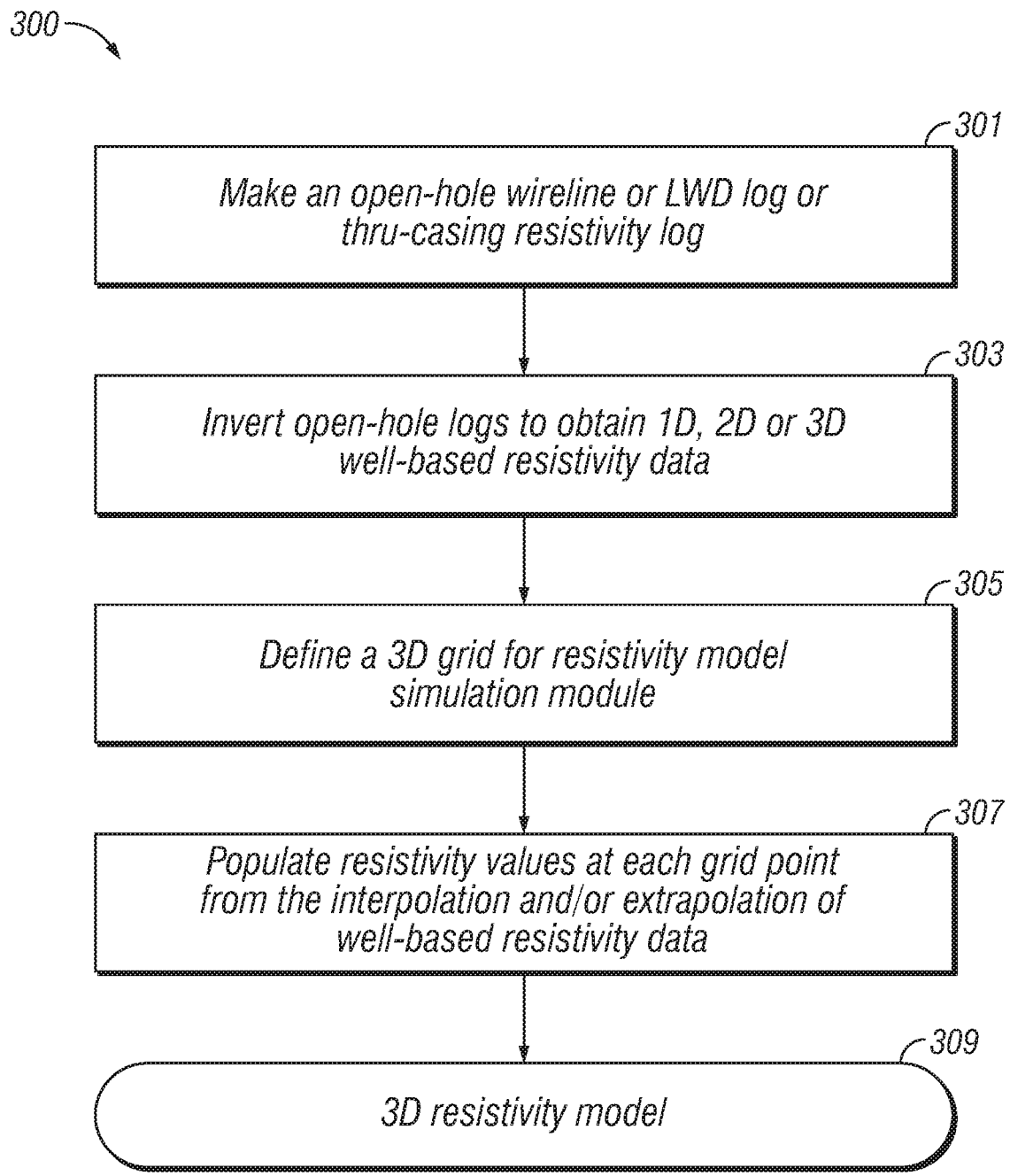
FIG. 3 shows a flowchart view of a method of determining a resistivity model of the earth formation, according to one or more embodiments.
Figure 4B:
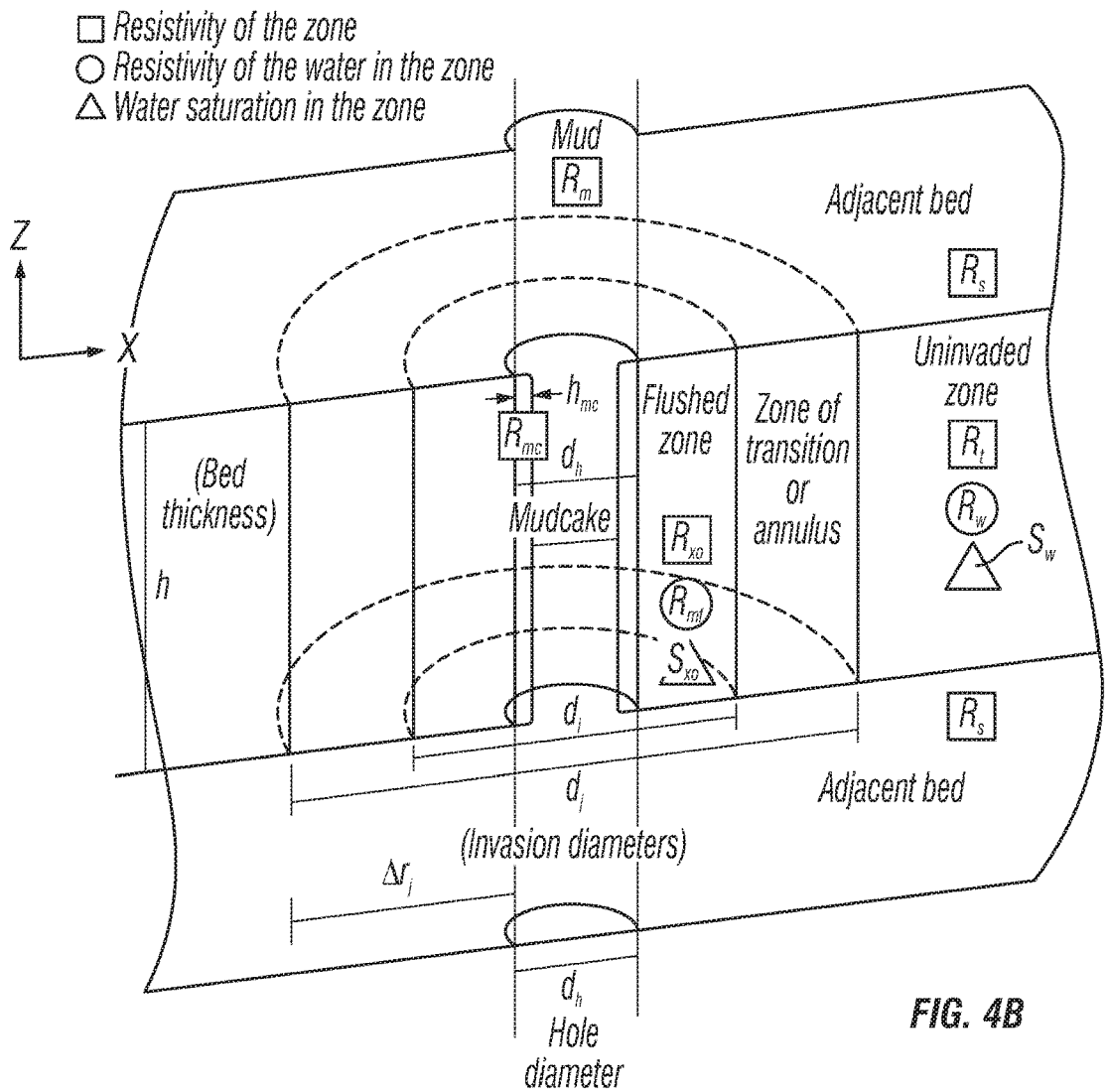
FIG. 4 shows a graph view of a three-dimensional resistivity model of the earth formation, according to one or more embodiments.
Figure 4C:
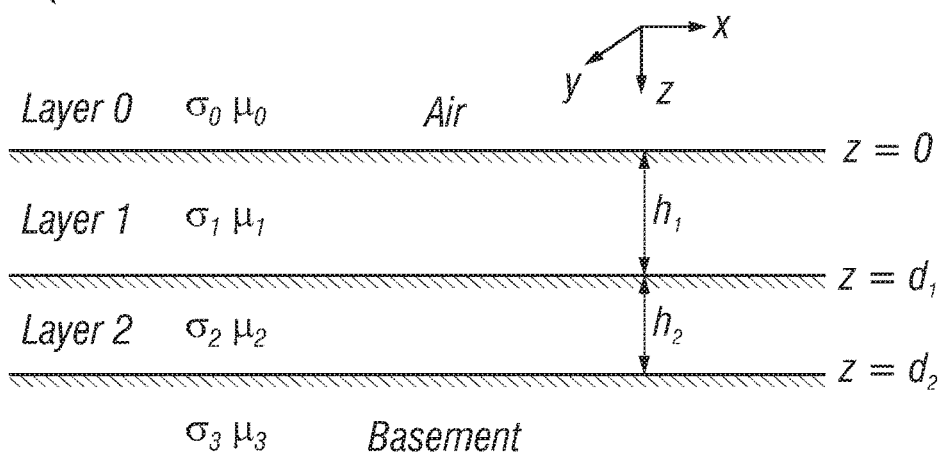

To design an EM monitoring system, an initial resistivity model is used to simulate EM data generated from the proposed design of the EM monitoring system. FIG. 2 shows a flowchart view of a method 200 of optimizing the design and/or parameters of an EM monitoring system (e.g., the system 10C of FIG. 1C) using a resistivity model of the earth formation. The initial resistivity model applied in the method 200 can be determined from various logging data, such as EM data, well data, seismic data, production data, and the like. FIG. 3 shows an example method of determining the resistivity model from EM data, for example EM data obtained from various logging tools before the EM monitoring system is installed in a well. FIGS. 4A-C depict examples of resistivity models in different dimensions that can be applied in the method 200 and other applications as described herein.

Figure 5:
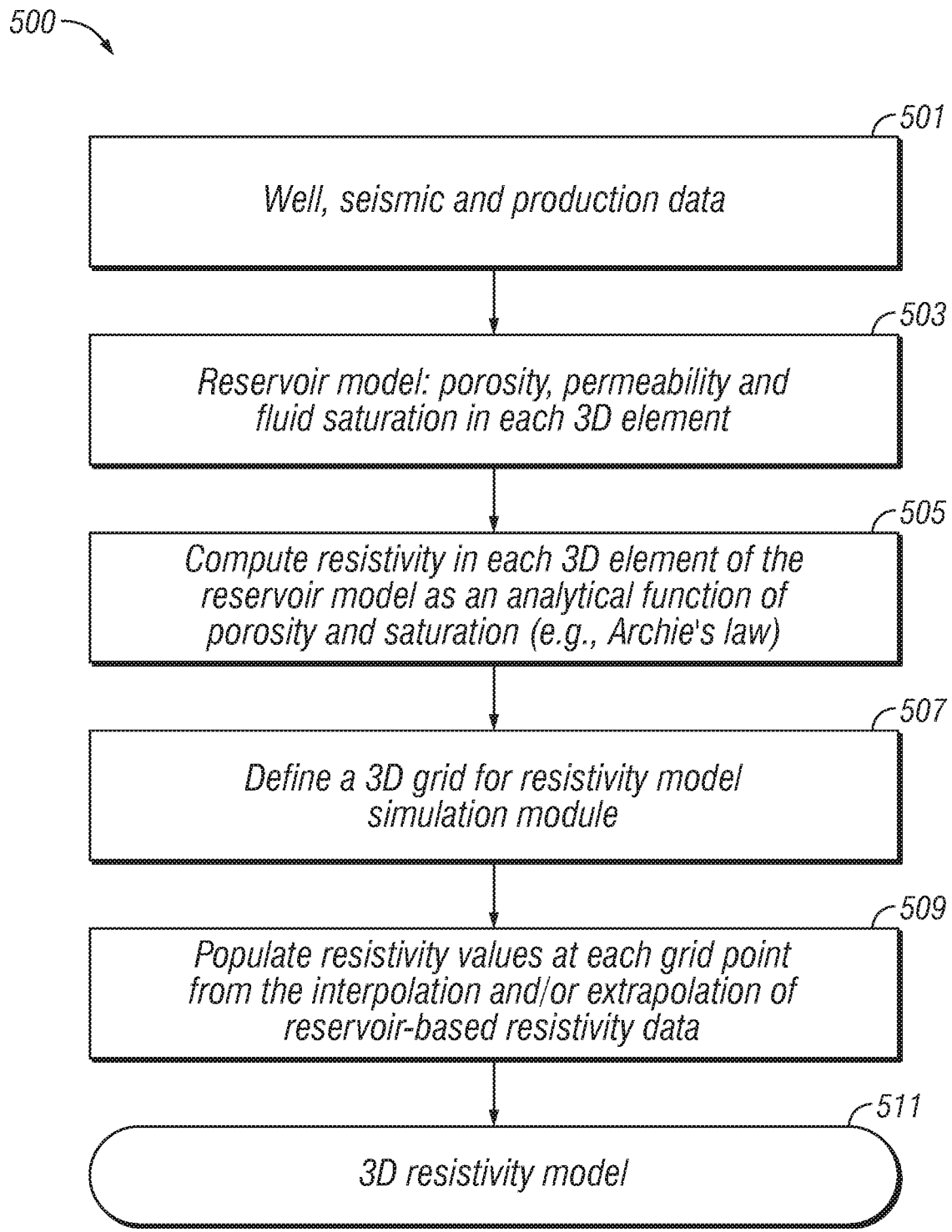
FIG. 5 shows a flowchart view of a method of determining a resistivity model of the earth formation, according to one or more embodiments.

Optionally, these resistivity models can be determined through relationships between resistivity and various formation and fluid properties. FIG. 5 shows a flowchart view of a method for determining the resistivity model based on the relationship between resistivity and other properties.

In FIG. 2, a flowchart view of a method 200 of optimizing the design and/or parameters of an EM monitoring system (e.g., the system 10C of FIG. 1C), according to one or more embodiments, is shown. In step 201, a design for an EM monitoring system is obtained and can include a transmitter type (e.g., galvanic, capacitive and/or inductive coupling), a receiver type, a transmitter-receiver spacing, a receiver spacing for ambient measurements (e.g., magnetotelluric), a transmitter axial orientation, a receiver axial orientation, a radiation pattern, an operating frequency, antenna efficiency, antenna directivity, antenna gain, and the like. In step 203, a resistivity model of a subterranean earth formation is generated using at least one of EM data, well data, seismic data, production data, and the like, as further described herein. It should be appreciated that the resistivity model can be a three-dimensional model, a two-dimensional model, a one-dimensional model, or any suitable model of the earth formation. In step 205, a power budget for the EM monitoring system is obtained, such as the power available and/or allocated to the EM monitoring system through cable 15C of FIG. 1C.

At step 207, a simulation module generates simulated EM data that may be obtained by the EM monitoring system based on the resistivity model, the power budget, and the system design obtained in steps 203-205. At step 209, the simulated EM data is used to generate simulated signal levels and sensitivities of the EM monitoring system. At step 211, the simulated signal levels and sensitivities are compared to threshold parameters, including but not limited to, minimum and maximum signal levels, minimum and maximum sensitivities, a maximum range between the minimum and maximum thresholds, and the like. In step 213, it is determined whether the simulated signal levels and/or the sensitivities satisfy the threshold parameters. If the simulated signal levels and/or the sensitivities satisfy the threshold parameters, the initial system design can be adopted as the optimum system design. At step 217, it is determined whether any other parameter can be optimized, such as the power budget and resistivity model. If any other parameter can be optimized, the simulation module continues to optimize the design based on the adjusted parameters. Otherwise, at step 221, the EM monitoring system is optimized and it can be deployed in a production well, such as the well 70 of FIG. 1C.

FIG. 3 shows a flowchart of an example method 300 to generate a resistivity model of the earth formation, in accordance with one or more embodiments. At step 301, EM data is obtained from an LWD and/or MWD tool (e.g., the tool 36 of FIG. 1A), a wireline and/or slickline tool (e.g., the logging string 60 of FIG. 1B), or through-casing tools (e.g., gamma ray tools, pulsed-neutron tools, through-casing resistivity tools, sonic wave tools, and the like). At step 303, an inversion is applied to the EM data to generate resistivity data associated with the formation as further described herein. A grid is defined for the simulation module, such as a one-dimensional grid, two-dimensional grid, or a three-dimensional grid, in step 305. Resistivity values from the resistivity data are populated at each grid point based on regression analysis, such as interpolation and/or extrapolation of the resistivity dated associated with the formation, to generate a resistivity model of the earth formation, such as a three-dimensional resistivity model, at steps 307 and 309.

In general, the electrical properties are heterogeneous in the formation. The distribution of the electrical properties in an earth model can be assumed to be piecewise continuous.

A three-dimensional (3D) earth model can be constructed as the juxtaposition of volume elements populated by discrete values of the electrical properties and the EM fields and/or sensitivities modeled using a simulation module.

FIG. 4A shows a graph view of an example three-dimensional resistivity model 400 of the earth formation that is generated based on logging data, according to one or more embodiments. The model 400 depicts the resistivity of the formation as a function of position in a three-dimensional Cartesian coordinate system with an x-axis, y-axis, and z-axis.

A two-dimensional (2D) earth model can be constructed as the juxtaposition of area elements populated by discrete values of the electrical properties, assuming that the electrical properties are homogeneous in the 2D model's strike direction and the EM fields and/or sensitivities modeled using a 2D or 2.5D simulation module.

FIG. 4B shows a schematic view of an example two-dimensional model 400B of the earth formation, according to one or more embodiments. The model 400B depicts the resistivity of the formation as a function of position in a two-dimensional Cartesian coordinate system with an x-axis and z-axis.

A vertical one-dimensional (V1D) earth model can be constructed as the juxtaposition of layers populated by discrete values of the electrical properties, assuming that the electrical properties are homogeneous in the 1D model's transverse direction and the EM fields and/or sensitivities modeled using a 1D simulation module.

FIG. 4C shows a schematic view of an example V1D earth model 400C of the earth formation, according to one or more embodiments. The model 400C depicts the resistivity of the formation as a function of position along a z-axis.

A radial one-dimensional (R1D) earth model can be constructed as the juxtaposition of layers populated by discrete values of the electrical properties, assuming that the electrical properties are homogeneous in the vertical and azimuthal directions.

The V1D and R1D earth models can be constructed from the imaging and/or inversion of logging-while-drilling (LWD) resistivity data, open-hole multi-component wireline resistivity data, open-hole wireline resistivity data, open-hole wireline dielectric data, and/or through-casing resistivity data.

It should be noted that the discretization of the earth model is chosen to be appropriate for the dimensionality and accuracy of the simulation module.

The earth models can be populated from the interpolation and/or extrapolation of well-based resistivity data within well-tied seismic-based structural models of different discretization. The interpolation and/or extrapolation algorithms may be based on geostatistical methods. The well-based resistivity data can be derived from any one or combination of logging-while-drilling (LWD) resistivity data, open-hole multi-component wireline resistivity data, open-hole wireline resistivity data, open-hole wireline dielectric data, or through-casing resistivity data.

Different attributes may be assigned to different grids and/or meshes as required for various simulation modules. For example, an EM simulation module may generally operate upon a different grid and/or mesh than a multi-phase flow simulation module. As such, the attributes of one grid and/or mesh can be interpolated and/or extrapolated to populate the attributes of another grid and/or mesh. Attribute transforms (e.g., resistivity to porosity, or vice versa) can be applied before or after such interpolation and/or extrapolation.

The dimensionality of the earth model and related simulation modules can be based on the requirements for solving particular interpretation problems. The simulation module can be based on any combination of analytical, semi-analytical, finite-difference, finite-volume, finite-element, boundary-element, or integral equation methods implemented in Cartesian, cylindrical, or polar coordinates. The simulation module can be programmed on serial and/or parallel processing architectures.

It should be appreciated that an earth model of a lower dimensionality can be extracted from an earth model of a higher dimensionality. For example, a 1D earth model can be extracted as a line of attributes interpolated from a 3D earth model. As another example, a 2D model can be extracted as a plane of attributes interpolated from a 3D earth model. The EM attributes of the earth model can be up-scaled and/or down-scaled as required using appropriate algorithms.

The resistivity model applied in the optimization method 200 of FIG. 2 and other applications further described herein may be generated from data other than EM data, such as well data, seismic data, gamma ray data, neutron-pulsed data, nuclear magnetic resonance data, sonic data, production data, temperature data, pressure data, and the like. For example, a resistivity model can be generated through formation physics-based relations of formation and fluid properties, such as, but not limited to, porosity, permeability, fluid saturation, and fluid resistivity. These formation physics-based relations enable electrical properties to be transformed to formation and fluid properties, and vice versa. For example, Archie's Law can be used to relate the resistivity to porosity and/or fluid saturation, or vice versa. Effective medium theory can be used to relate the resistivity to porosity, grain size, grain orientation, fluid saturation, and fluid resistivity, or vice versa.

As used herein, well data refers to parameters associated with the formation obtained from well logging operations including but not limited to those operations depicted in FIGS. 1A and B. As used herein, production data refers to one or more parameters associated with producing a fluid from a well, including but not limited to, production volume as a function of time (e.g., barrels per day), flow rate at different zones in the well, production logging, spacing between an injector well and a producing well, injection rate, injector well pressure, salinity of the injected fluid, resistivity of the injected fluid, and the like.

FIG. 5 shows a flowchart of an example method 500 of generating a resistivity model of the earth formation based on the relationship between resistivity and various formation and fluid properties, in accordance with one or more embodiments. At step 501, other logging data is obtained from an LWD and/or MWD tool (e.g., the tool 36 of FIG. 1A), a wireline and/or slickline tool (e.g., the logging string 60 of FIG. 1B), or through-casing tools (e.g., gamma ray tools, pulsed-neutron tools, through-casing resistivity tools, sonic wave tools, and the like). At step 503, a reservoir model of the formation is generated based on the logging data including, but not limited to, porosity, permeability, fluid saturation, porosity, grain size, grain orientation, and fluid resistivity. At step 505, the reservoir model elements are converted to resistivity elements using a transformation function, such as Archie's law, effective medium theory, and the like. A grid is defined for the resistivity model, such as a one-dimensional grid, two-dimensional grid, or a three-dimensional grid, in step 507. Resistivity values are populated at each grid point based on regression analysis, such as interpolation and/or extrapolation of the resistivity data associated with the formation, to generate a resistivity model of the earth formation (e.g., the three-dimensional resistivity model of FIG. 4) at steps 509 and 511. It should be appreciated that a resistivity model such as the models determined in methods 300 and/or 500 of FIGS. 3 and 5, respectively, can be applied in various applications, such as the optimization method 200 of FIG. 2, the feasibility method 600 of FIG. 6, the range determination method 700 of FIG. 7, and the operational parameter determination method 800 of FIG. 8, as described herein.

Figure 6:
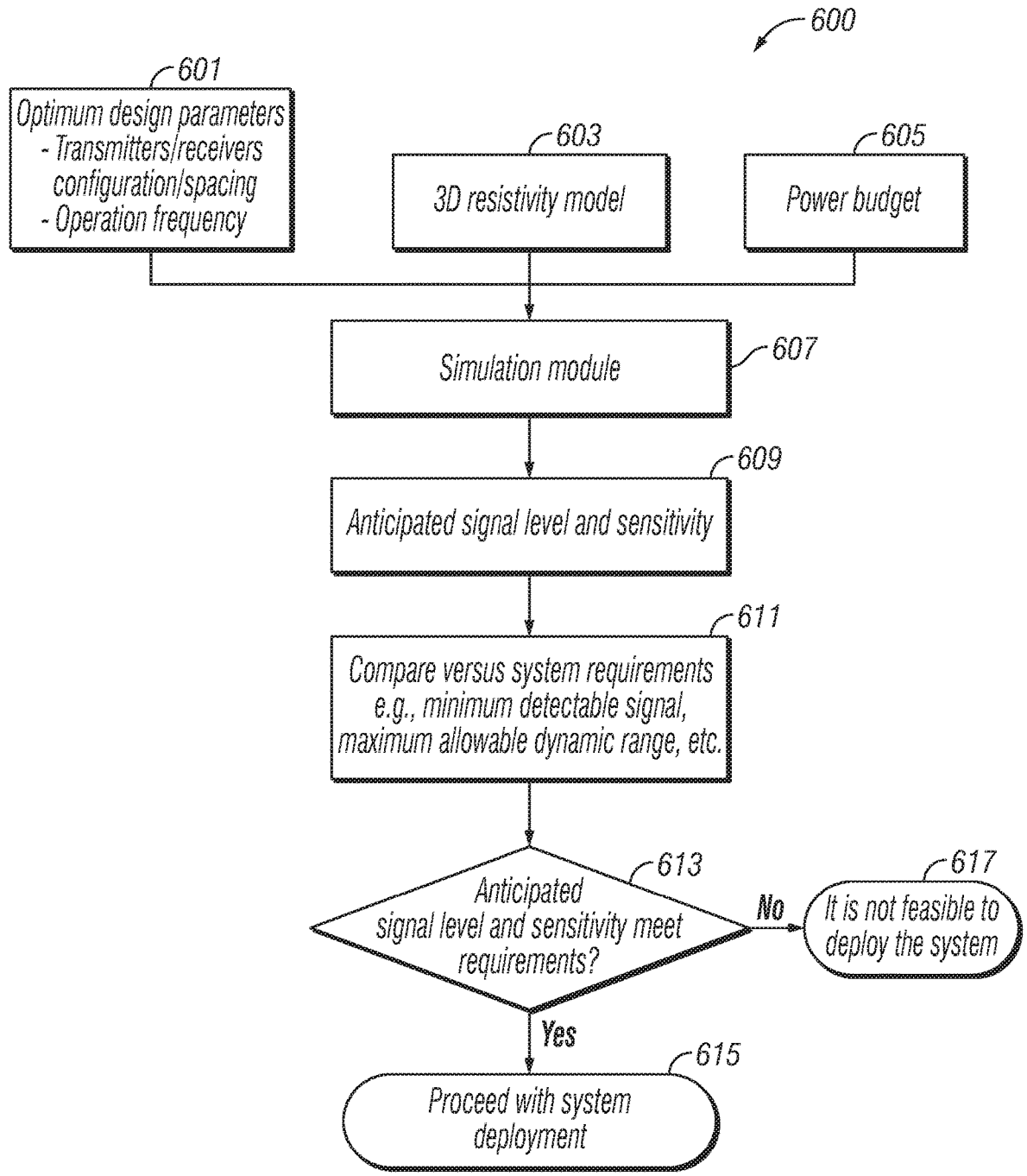
FIG. 6 shows a flowchart view of a method of determining the feasibility of using an EM monitoring system in a well, according to one or more embodiments.
Figure 7:
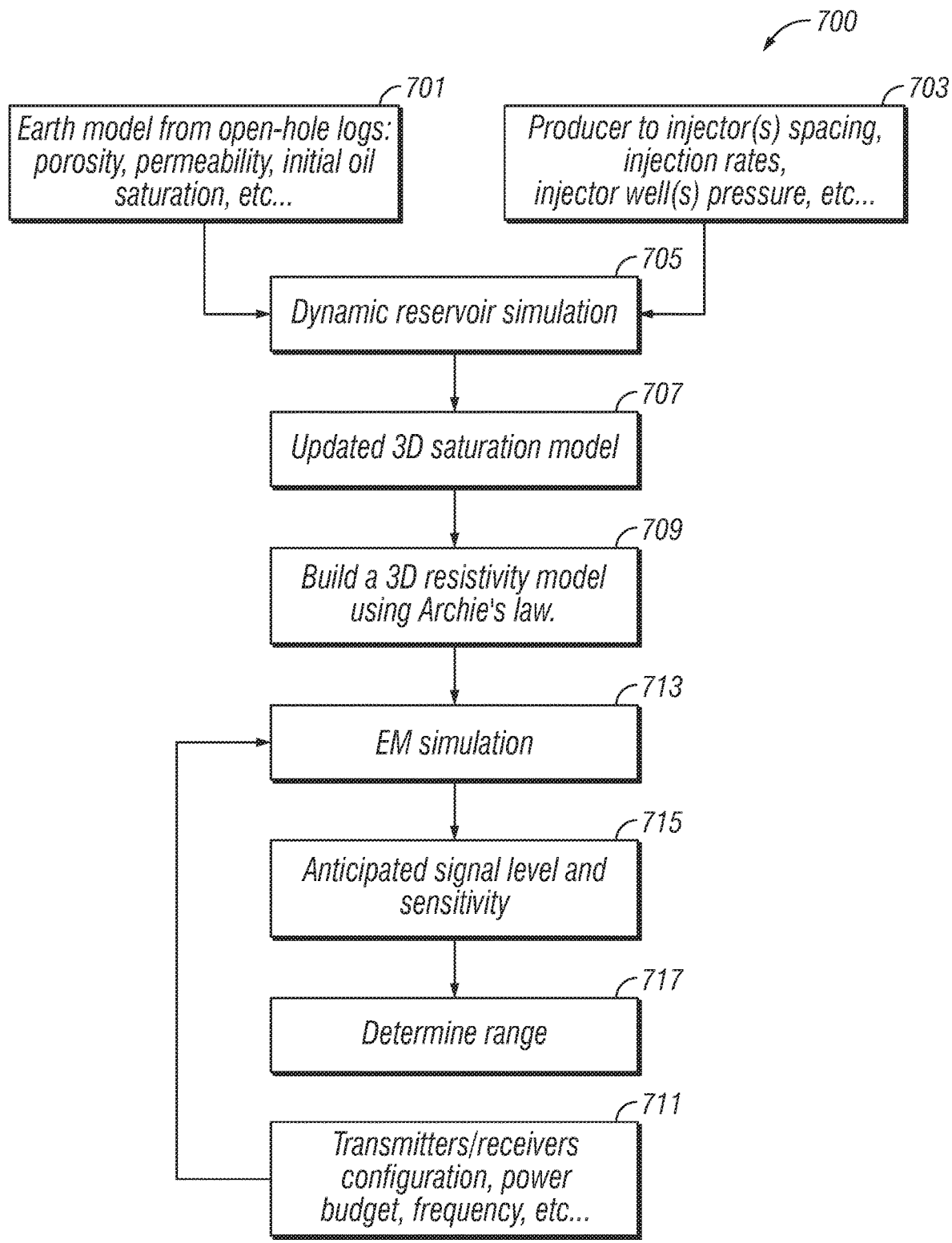
FIG. 7 shows a flowchart view of method of determining a detection range of an EM monitoring system, according to one or more embodiments.

FIGS. 6 and 7 show flowchart views of other methods for designing an EM monitoring system. For example, a resistivity model can be used to simulate the static and/or time-lapse EM fields that might be measured from a particular transmitter and/or receiver configuration and/or system parameters (e.g., frequency) of an EM reservoir monitoring system to determine the feasibility of using the EM monitoring system in a well. As another example, a resistivity model can be used to determine the range of an EM monitoring system under dynamic reservoir conditions, such as changing waterflood fronts.

FIG. 6 shows a flowchart view of a method 600 of determining the feasibility of using an EM monitoring system in a well, according to one or more embodiments. In step 601, a design for an EM monitoring system is obtained and can include a transmitter type (e.g., galvanic, capacitive, and/or inductive coupling), a receiver type (e.g., galvanic, capacitive, and/or inductive coupling), a transmitter-receiver spacing, a receiver spacing for ambient measurements (e.g., magnetotelluric), a transmitter axial orientation, a receiver axial orientation, a radiation pattern, an operating frequency, antenna efficiency, antenna directivity, antenna gain, and the like. In step 603, a resistivity model of a subterranean earth formation is generated using at least one of EM data, well data, seismic data, production data, and the like, as described herein (e.g., the methods 300 and 500 of FIGS. 3 and 5, respectively). In step 605, a power budget for the EM monitoring system is obtained, such as the power available and/or allocated to the EM monitoring system through cable 15C of FIG. 1C.

At step 607, a simulation module generates simulated EM data that may be obtained by the EM monitoring system based on the resistivity model, the power budget, and the system design obtained in steps 603-605. From the simulated EM data, simulated signal levels and sensitivities of the EM monitoring system can be determined at step 609. The simulated signal levels and sensitivities are compared with threshold parameters, including but not limited to, minimum and maximum signal levels, minimum and maximum sensitivities, a maximum range between the minimum and maximum thresholds, and the like.

At steps 613-617, it is determined whether the simulated signal levels and sensitivities satisfy the threshold parameters. If the threshold parameters are satisfied, the EM monitoring system may be deployed in the well. Otherwise, it is determined that the EM monitoring system is not suitable for that well and it is not feasible to use this particular design of the EM monitoring system in this well.

FIG. 7 shows a flowchart view of an example method 700 of determining the range of an EM monitoring system to detect waterflood fronts, in accordance with one or more embodiments. At steps 701, a reservoir model of the formation is generated based on logging data including, but not limited to, porosity, permeability, fluid saturation, porosity, grain size, grain orientation, and fluid resistivity. At step 703, parameters associated with the waterflood operation are obtained, including but not limited to, spacing between an injector well and a producing well, injection rate, injector well pressure, salinity of the injected fluid, resistivity of the injected fluid, and the like. At step 705, a dynamic reservoir simulation of the waterflood is generated based on the reservoir model and the parameters associated with the waterflood operation. At step 707, a saturation model of the formation is generated based on the reservoir model. At step 709, the saturation model is converted to a resistivity model of the formation using a transformation function, such as Archie's law, effective medium theory, and the like.

At step 711, a design for an EM monitoring system and its power budget are obtained. The design of the EM monitoring system can include a transmitter type (e.g., galvanic, capacitive, and/or inductive coupling), a receiver type (e.g., galvanic, capacitive, and/or inductive coupling), a transmitter-receiver spacing, a receiver spacing for ambient measurements (e.g., magnetotelluric), a transmitter axial orientation, a receiver axial orientation, a radiation pattern, an operating frequency, antenna efficiency, antenna directivity, antenna gain, and the like. At step 713, a simulation module generates simulated EM data that may be obtained by the EM monitoring system based on the resistivity model, the power budget, and the system design obtained in steps 709 and 711. At step 715, the simulated EM data is used to generate simulated signal levels and sensitivities of the EM monitoring system. With these, the range of the EM monitoring system to detect the simulated waterflood fronts (e.g., a radial depth from the wellbore) can be determined, at step 717.

It should be appreciated that the detection range of an EM monitoring system can be determined by accounting for and/or simulating other dynamic reservoir conditions, such as hydraulic fracturing, acidizing, etc.

It should be appreciated that the methods 200, 600, and 700 can be applied in combination with each other to determine an optimal design for an EM monitoring system.

Figure 8:
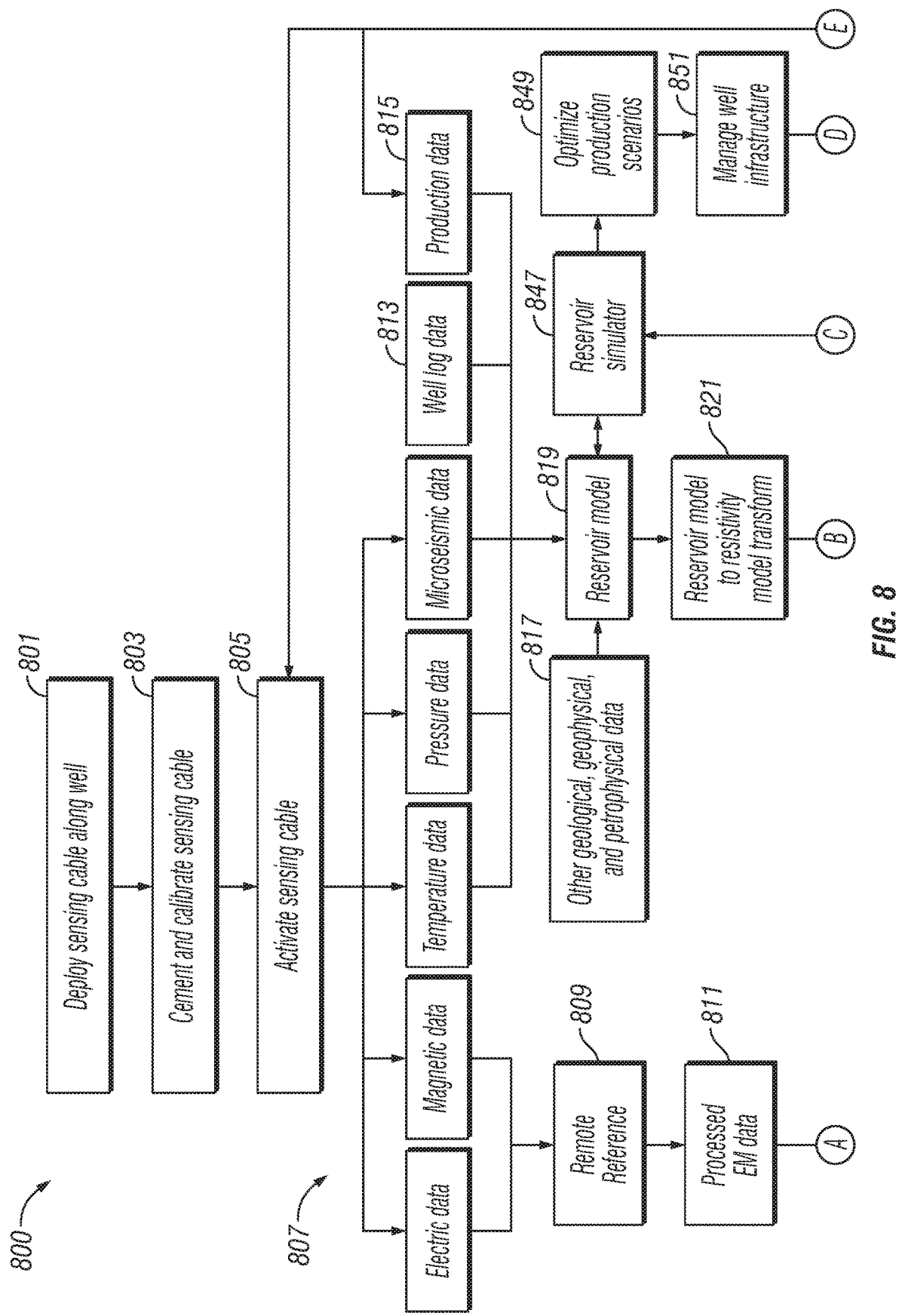
FIG. 8 shows a flowchart view of a method of determining an operational parameter to optimize well production, according to one or more embodiments
Figure 8:
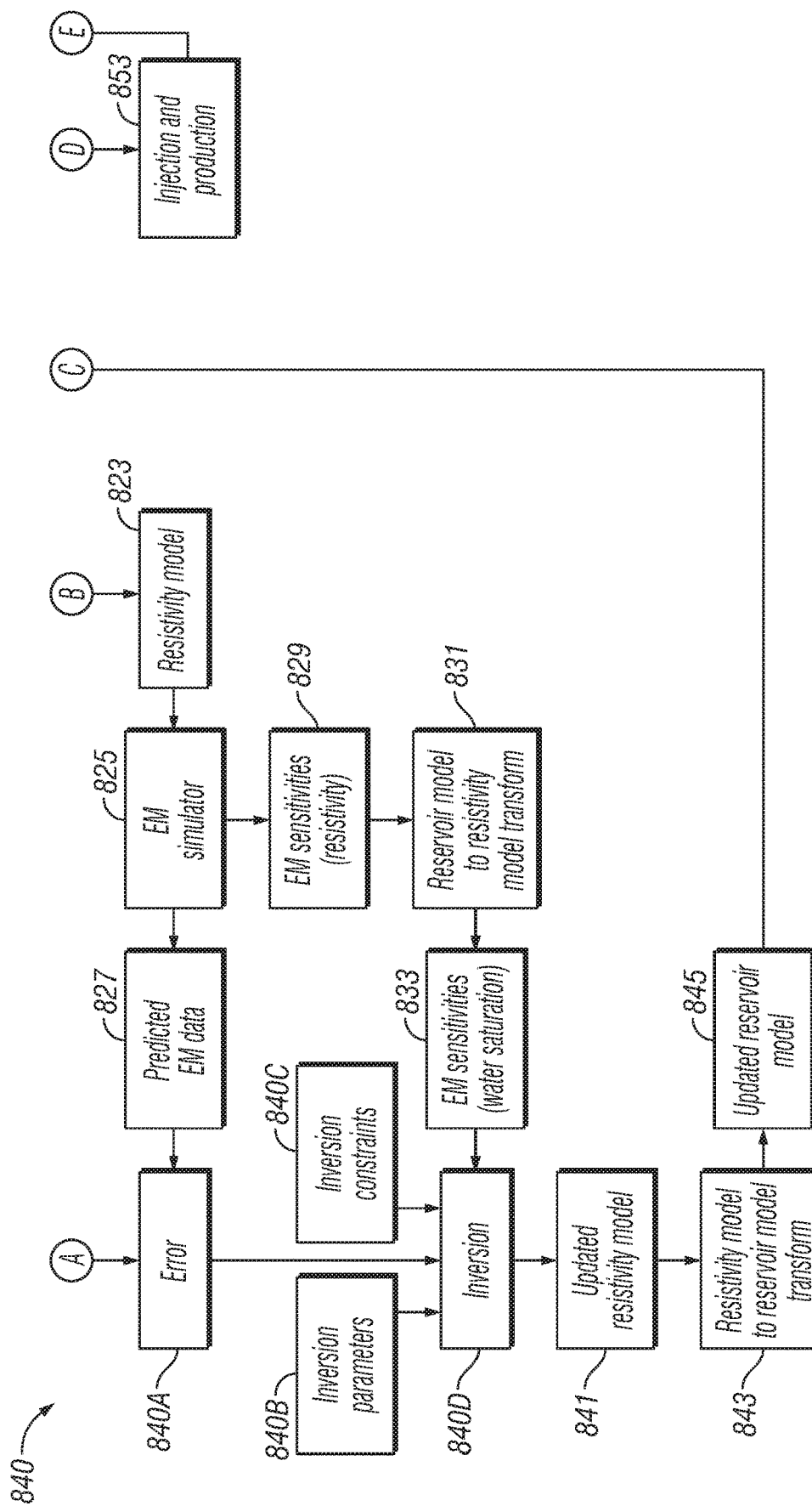
Figure 9:
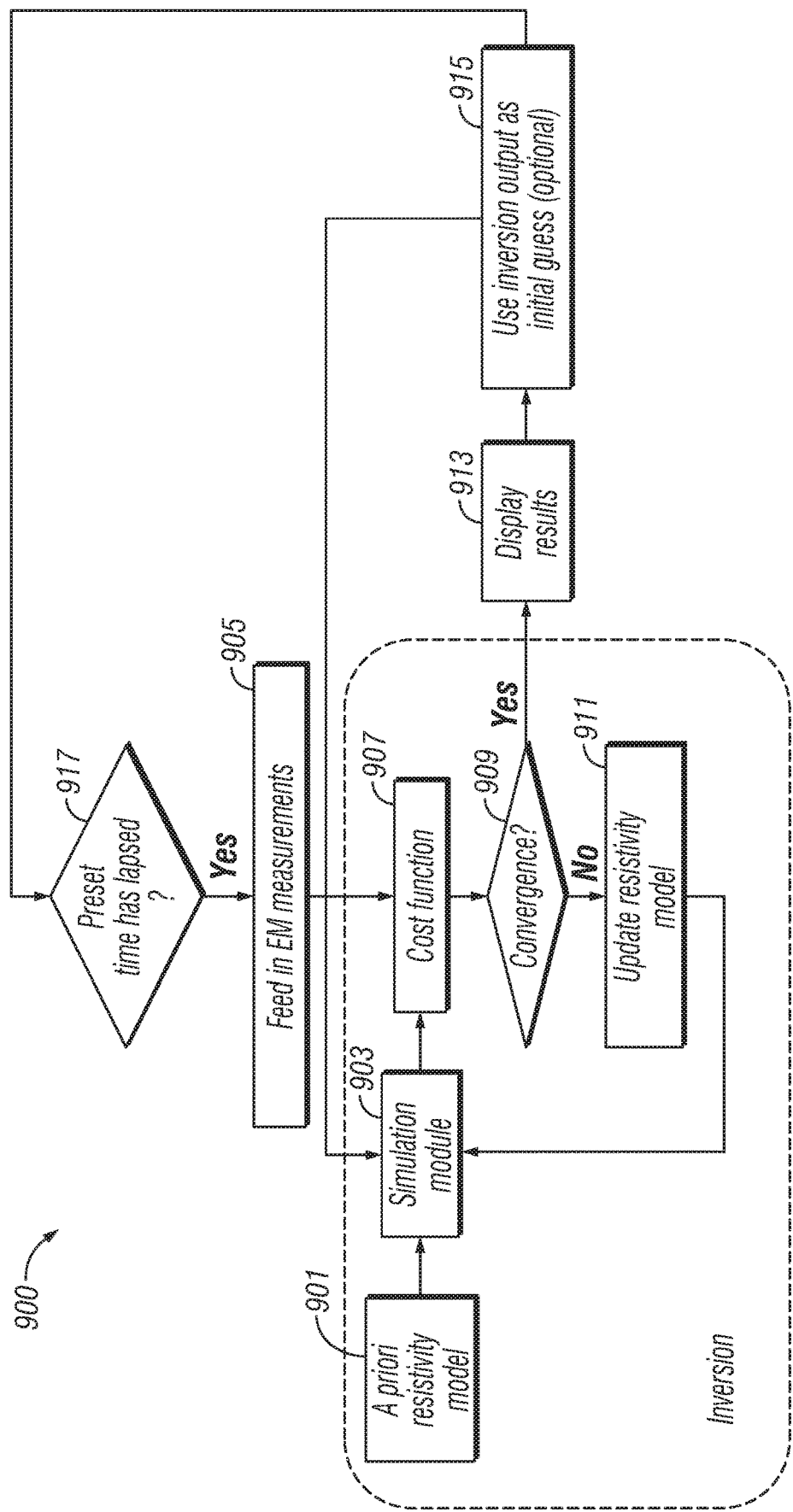
FIG. 9 shows a flowchart view of an inversion method for an EM monitoring system, according to one or more embodiments.
Figure 10:
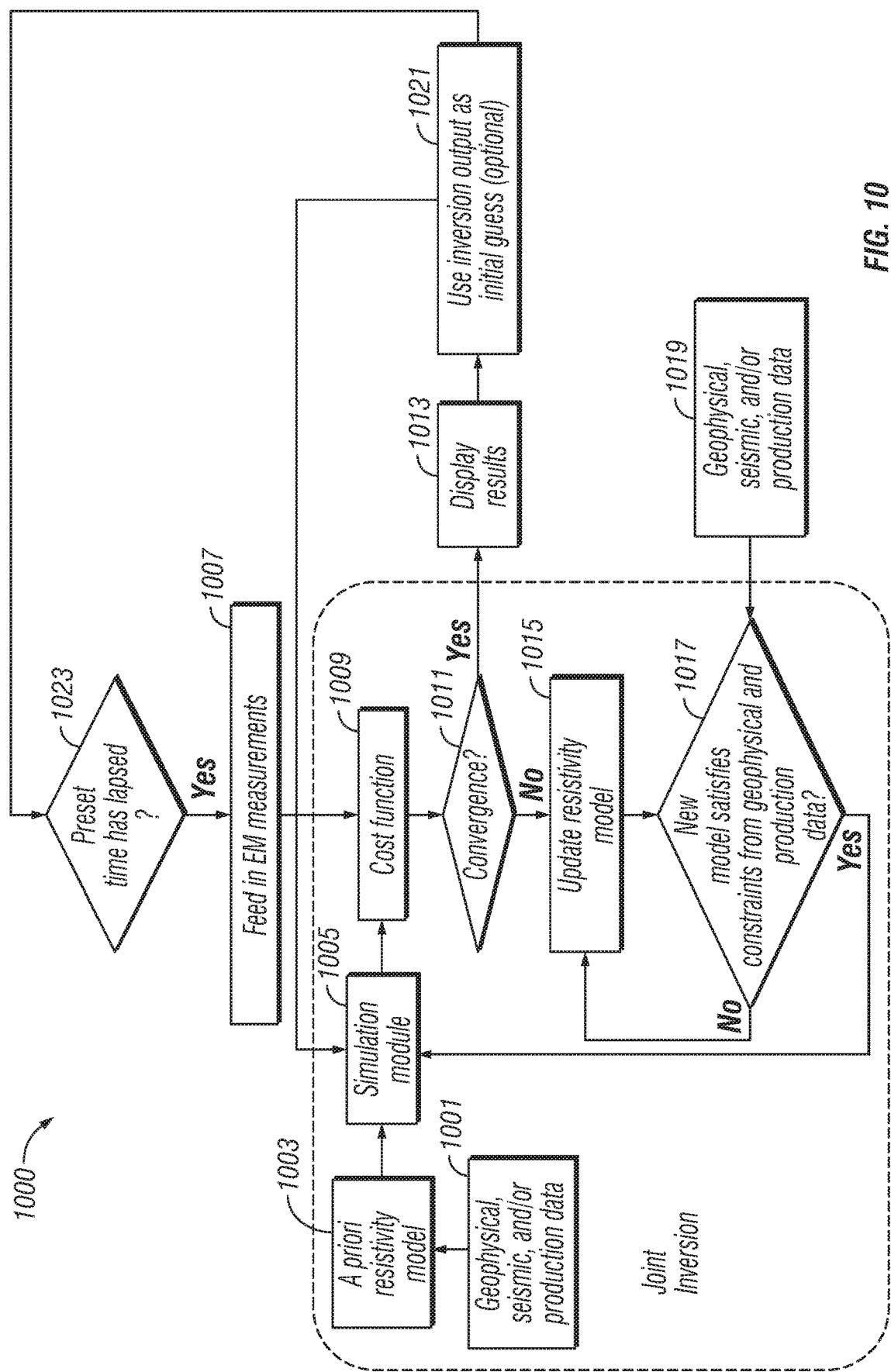
FIG. 10 shows a flowchart view of a joint inversion for an EM monitoring system with logging data, according to one or more embodiments.

FIGS. 8-10 show flowchart views of methods for using the EM monitoring system to model an earth formation. For example, a resistivity model generated from an EM monitoring system can be used to manage operation of a reservoir, such as adjusting operational parameters for multi-zone completion systems. In particular, FIGS. 9 and 10 show flowchart views for inversion methods 900 and 1000, respectively, to determine a resistivity model of an earth formation. The inversion methods 900 and/or 1000 can be applied in the method 800 as described below.

FIG. 8 shows a flowchart of a method 800 for managing production from a well or a reservoir, in accordance with one or more embodiments. At step 801, an EM reservoir monitoring system is deployed in a well. With the EM monitoring system calibrated and activated (steps 803 and 805), the EM monitoring system generates logging data including, but not limited to, electric field data, magnetic field data, temperature data, pressure data, and microseismic data (807). Measurements of pressure, temperature, salinity, and other physical quantities (e.g., microseismic events) may be made from the same integrated fiber optic sensor system (e.g., the system 10C of FIG. 1C).

The EM data is measured by an array of electric and/or magnetic field sensors deployed on or within a well casing, such as the EM monitoring system 10C of FIG. 1C. This EM data is processed (811) and can include, but is not limited to, components of the transient electric and/or magnetic fields of telluric currents outside and within the reservoir, spontaneous potentials, controlled-source electromagnetic data, electric field measurements, magnetic field measurements, or a combination thereof.

In cases where natural sources (telluric measurements) are used, the transient electric and/or magnetic fields of the telluric currents are processed and transformed to the frequency domain as processed magnetotelluric (MT) data, including but not limited to the elements of a 3×2 impedance tensor. Remote reference electric and/or magnetic fields may be made for the purpose of noise cancellation to improve signal-to-noise of the processed MT data (809).

A reservoir model is constructed from available geological, geophysical, petrophysical, and production data (813-819). An effective medium model described by an analytic formula (e.g., Archie's law) is used to transform the formation and fluid properties of the reservoir model to resistivity properties of the reservoir model (821). A resistivity model (823) is populated across a grid based on the resistivity properties determined from the transform (821). In a simulation module 825, the resistivity model is used to generate simulated EM data 827 and to compute their sensitivities with respect to resistivity (829). An effective medium model described by an analytic formula (e.g., Archie's law) is used to transform the EM sensitivities with respect to resistivity to the EM sensitivities with respect to the water saturation (831 and 833).

An iterative inversion (840, 840A-D) is performed to generate an updated water saturation model that minimizes the misfit between the processed and simulated EM data (811 and 827, respectively) subject to regularization and other imposed constraints such as mass conservation, as further described herein. Optionally, the EM data is jointly inverted (840, 840A-D) with other geophysical data measured by the monitoring system, such as pressure, temperature, electrical, electromagnetic, gravity, and/or seismic data, as further described herein with respect to FIG. 10.

Upon termination of the iterative inversion 840, an updated resistivity model of the formation is generated (841) and converted to a reservoir model (843), such as an updated water saturation model (845). This updated reservoir model is cycled to the reservoir simulation module for optimizing injection and/or production scenarios to determine an operational parameter, such as a production parameter, a logging parameter, a monitoring parameter, a drilling parameter, and a completion parameter.

As used herein, a production parameter refers to a parameter relating to producing a fluid from a well, such as production volume as a function of time (e.g., barrels per day), flow rate at different zones in the well, production logging, spacing between an injector well and a producing well, injection rate, injector well pressure, salinity of the injected fluid, resistivity of the injected fluid, and the like. A logging parameter refers to a parameter collected from a logging tool such as those depicted in FIGS. 1A-1B. A monitoring parameter refers to a parameter collected from an EM monitoring system. A drilling parameter refers to a parameter relating to wellbore drilling operations such as surface data logging and the like. A completion parameter refers to a parameter relating to well completion operations.

The optimal injection and/or production scenario (849) is selected with appropriate modification to well infrastructure (851) such as a multi-zone intelligent completion system during injection and/or production. It should be appreciated that the method 800 can operate continuously and autonomously without intervention. The method 800 can operate until any number of iterations is completed. Although the method 800 is depicted as a continuous loop, it is not necessary for the method 800 to operate continuously, and the method 800 can terminate once an operational parameter is determined.

In one or more embodiments, a resistivity model can be used as an a priori model for inversion of the EM data measured from an EM reservoir monitoring system (e.g., the inversion 840 of FIG. 8).

FIG. 9 shows a flowchart view of a method 900 for an iterative inversion to update a resistivity model, in accordance with one or more embodiments. As shown, an a priori resistivity model is generated based on EM data obtained from an an LWD and/or MWD tool (e.g., the tool 36 of FIG. 1A), a wireline and/or slickline tool (e.g., the logging string 60 of FIG. 1B), or through-casing tools (e.g., gamma ray tools, pulsed-neutron tools, through-casing resistivity tools, sonic wave tools, and the like), at step 901. It should be appreciated that the a priori resistivity model may be generated from other logging data, for example according to the method 500 of FIG. 5.

A simulation module generates simulated EM data based on the resistivity model obtained at step 903. The EM data 905 obtained from an EM monitoring system (e.g., the system 10C of FIG.1C) is compared with the simulated EM data based on a suitable cost function 907. It is determined whether the resistivity model and the EM data converge (909), and if so, the resistivity model may be output to a suitable medium (913). Otherwise, an updated resistivity model 911 is generated and iteratively applied to the cost function 907 until convergence is achieved 909.

Optionally, the converged resistivity model 915 may be applied as the initial guess of the resistivity model in the inversion at later time, for example, after a preset time has lapsed 917 and additional EM data is measured with the EM monitoring system at step 905. Each time additional EM data is measured with the EM monitoring system at step 905, the converged resistivity model 915 can be applied as the initial guess. Although the method 900 is depicted as a continuous loop, it is not necessary for additional EM data to be measured and inverted.

In one or more embodiments, geophysical and/or production data can be used as ancillary constraints in an inversion of the EM data measured from an EM reservoir monitoring system (e.g., the inversion 840 of FIG. 8).

FIG. 10 shows a flowchart view of a method 1000 for a joint inversion of EM data obtained from an EM monitoring system (e.g., the system 10C of FIG. 1C) with other geophysical and/or production data, in accordance with one or more embodiments. As shown, an a priori resistivity model 1003 is generated based on logging data 1001, for example according to the method 500 of FIG. 5. It should be appreciated that the a priori resistivity model 1003 may be generated from EM data obtained an LWD and/or MWD tool (e.g., the tool 36 of FIG. 1A), a wireline and/or slickline tool (e.g., the logging string 60 of FIG. 1B), or through-casing tools (e.g., gamma ray tools, pulsed-neutron tools, through-casing resistivity tools, sonic wave tools, and the like), for example according to the method 300 of FIG. 3.

A simulation module generates simulated EM data based on the resistivity model obtained at step 1005. EM data 1007 obtained from an EM monitoring system (e.g., the system 10C of FIG.1C) is compared with the simulated EM data based on a suitable cost function 1009. It is determined whether the simulated EM data and the measured EM data converge (1011), and if so, the resistivity model may be output to a suitable medium (1013). Otherwise, an updated resistivity model 1015 is generated by adjusting suitable parameters associated with the model.

At step 1017, it is determined whether the updated resistivity model satisfies ancillary constraints, such as constraints established from geophysical and production data 1019. For example, the updated resistivity model may be compared with a constraint related to the conservation of mass in the water saturation as further described below. If so, the updated resistivity model is used to generate simulated EM data with the simulation module at step 1005. Otherwise, the resistivity model is updated until it satisfies the constraints established from geophysical and/or production data at steps 1015 and 1017, as further described herein.

Optionally, the converged resistivity model 1021 may be applied as the initial guess of the resistivity model in the inversion at a later time, for example, after a preset time has lapsed 1023 and additional EM data is measured with the EM monitoring system 1007. Each time additional EM data is measured with the EM monitoring system at step 1007, the converged resistivity model 1021 can be applied as the initial guess. Although the method 1000 is depicted as a continuous loop, it is not necessary for additional EM data to be measured and inverted.

As an example of applying ancillary constraints in the joint inversion method 1000, a resistivity model can be used to monitor the oil-water contact of a waterflood. During a waterflood, the oil-water contact is not an abrupt interface between oil and water, but rather is a zonal boundary where the oil saturation decreases from its in situ value to its residual value.

A suite of probabilistic (e.g., P10, P50, P90) 3D reservoir models are constructed using earth modeling methods from available well, seismic, and production data, as described herein. Properties of the reservoir models include porosity, permeability, and fluid saturation. The resistivity in each 3D element of each reservoir model can be evaluated as an analytical function of porosity and water saturation $S_w$ (e.g., Archie's Law).

The earth model for an EM reservoir monitoring system encompasses a volume of interest (VOI) about the well upon which the system is installed, e.g., the well 70 of FIG. 1C. The VOI is discretized to a grid of 3D elements with dimensions appropriate to the geological features of interest and the accuracy and stability of the simulation module. The VOI includes a sub-volume of the reservoir model. The resistivity elements of the reservoir model are interpolated as the resistivity elements of the VOL In one or more embodiments, for those elements in the VOI not within a sub-volume of the reservoir model, the resistivity elements of the VOI are obtained from geostatistical interpolations and/or extrapolations from resistivity well logs.

When repeated for each probabilistic 3D reservoir model, this process constructs a suite of probabilistic 3D resistivity models (e.g., P10, P50, P90) for the EM reservoir monitoring system.

The suite of models can be input as a suite of a priori models to a 3D EM inversion (e.g., the inversion methods of FIGS. 8 and 10), whereby the formation resistivity p in each element of the earth model is an analytical function of the water saturation $S_w$ (e.g., Archie's Law) such that the sensitivities can be evaluated with the chain rule:

$$\frac{\partial E}{\partial S_w} = \frac{\partial E}{\partial \rho} \times \frac{\partial \rho}{\partial S_w}, \quad (1)$$

where the sensitivities $\partial E/\partial \sigma$ can be evaluated with adjoint operators, and $\partial \sigma/\partial S_w$ has a known analytical form. It should be understood that equation (1) is not restricted to Archie's Law, as any analytic function relating the conductivity/resistivity and water saturation can be applied. It should be understood that these sensitivities can be applied in the methods 200, 600, and 700 as well.

For each probabilistic 3D resistivity model, the inversion of the EM data for a corresponding water saturation model is based on minimization of the Tikhonov parametric functional:

$$P^\alpha(S_w) = \|W_d d - W_d A(S_w)\|_D^2 + \alpha \|W_m S_w - W_m S_{w,apr}\|_M^2 \to \min, \quad (2)$$

where d is the $N_d$ length vector of observed data, $S_w$ is the $N_m$ length vector of the water saturation model, $S_{w,apr}$ is the $N_m$ length vector of the a priori water saturation model constructed from a priori geological, geophysical, and petrophysical information, $W_d$ and $W_m$ are data and model weighting matrices, respectively, and a is the regularization parameter which balances (or biases) the misfit and stabilizing functions. The minimization of the parametric function (equation (2)) can be readily accomplished with a suitable gradient based optimization method.

It is noted that the inverse problem of equation (2) is highly constrained with the inclusion of the earth model as an a priori model, as well as with the inclusion of other information from geological, seismic, well, and production data. For example, the model weighting matrix $W_m$ has values which penalize any model changes outside of all pre-defined producing reservoir formations from which all changes in EM data (and thus water saturation) are reasonably expected.

For the purpose of reservoir monitoring, the minimization of the parametric functional (equation (2)) is subjected to the ancillary constraints (e.g., at steps 1017 and 1019 of FIG. 10) that assume the total change in mass of water in the updated water saturation model is conserved:

$$m_w = \int_V \Delta S_w(r) \phi(r) p_w(r) d^3 r \quad (3),$$

where $m_w$ is the total mass of water injected (known from production data), $p_w$ is the water density (which may vary with salinity and temperature). Further, the water saturation in the model can only increase, given by:

$$\Delta S_w(r) = S_w(r) - S_{w,apr}(r) > 0 \quad (4)$$

The water saturation is bound by:

$$0 \leq S_w(r) \leq 1 - S_r(r) \quad (5),$$

where $S_r$ is the residual oil saturation.

It should be appreciated that the water saturation models derived from the multiple inversions are discretized on the grid of the 3D resistivity model.

The suite of probabilistic water saturation models are interpolated to the reservoir model grid, where they are used to update the reservoir models for history matching and predicting future production scenarios using multiphase flow simulators, for example according to the method 800.

It should be understood that the imaging, inversion, or joint inversion algorithms may be deterministic or stochastic. The modeling methods described herein can be implemented in real-time. The modeling methods described herein can be implemented as stand-alone software, or integrated as part of other modeling software and related methods through an application programmable interface (API) (e.g., DecisionSpace® available from Halliburton Energy Services, Inc.). The earth modeling methods described herein can be encapsulated in software which may be programmed on serial and/or parallel (including graphical processing units (GPUs)) processing architectures. The earth modeling methods described herein and related functions may be performed remotely from the well site (e.g., via cloud computers), whereby the data acquisition systems at the well site are connected to the remote processing computers via a network. This means that any computers at the well site do not require high computational performance, and processing can effectively be done in real time. The earth modeling methods described herein can be applied to EM reservoir monitoring from a single well or multiple wells. The earth modeling methods described herein can be integrated as part of an EM reservoir monitoring system, including fiber optic-based EM reservoir monitoring systems.

In addition to the embodiments described above, many examples of specific combinations are within the scope of the disclosure, some of which are detailed below:

Example 1: An electromagnetic (EM) monitoring system for a subterranean earth formation, comprising:
  a receiver locatable in a wellbore, responsive to EM radiation propagating through the formation and configured to generate EM data associated with the formation;
  a processor configured to:
    generate a reservoir model of the earth formation based onadditional data associated with the formation;
    convert the reservoir model to a resistivity model of the formation;
    generate simulated EM data based on the resistivity model of the formation;
    compare the EM data and the simulated EM data;
    generate an updated resistivity model based on the comparison between the EM data and the simulated EM data; and
    determine an operational parameter based on the updated resistivity model to manage production from a well.

Example 2: The system of example 1, wherein the EM data comprises an electric field measurement and a magnetic field measurement.

Example 3: The system of example 1, further comprising a transmitter to generate EM radiation in the formation, wherein the processor is further configured to determine a design of the receiver and transmitter based on the updated resistivity model.

Example 4: The system of example 1, wherein the processor is further configured to generate the updated resistivity model based on sensitivities of the EM data to water saturation in the formation.

Example 5: The system of example 1, wherein the processor is further configured to constrain the updated resistivity model based on mass conservation in a water saturation model of the formation.

Example 6: The system of example 1, wherein the additional data comprises at least one of temperature data, pressure data, microseismic data, well data, and production data.

Example 7: The system of example 1, wherein the processor is further configured to generate the updated operational parameter based on the reservoir model.

Example 8: The system of example 1, further comprising a multi-zone completion system, wherein the processor is further configured to apply the operational parameter to the multi-zone completion system.

Example 9: The system of example 1, wherein the operational parameter comprises at least one of a production parameter, a logging parameter, a measurement parameter, a drilling parameter, and a completion parameter.

Example 10: The system of example 3, wherein the design includes at least one of a transmitter type, a transmitter spacing, a receiver type, a receiver spacing, and an operating frequency.

Example 11: A method of monitoring a subterranean earth formation using an electromagnetic (EM) monitoring system, comprising:
  receiving EM radiation propagating in the formation with a receiver located in a wellbore;
  generating EM data associated with the formation in response to the received EM radiation using a processor;
  gnerating a reservoir model of the formation based on additional data associated with the formation using the processor;
  converting the reservoir model to a resistivity model of the formation;
  generating simulated EM data based on the resistivity model of the formation using the processor;
  comparing the EM data with the simulated EM data;
  generating an updated resistivity model based on the comparison between the EM data and the simulated EM data using the processor; and
  determining an operational parameter based on the updated resistivity model to manage production from a well.

Example 12: The method of example 11, further comprising measuring an electric field and a magnetic field to generate the EM data.

Example 13: The method of example 11, wherein generating the updated resistivity model further comprises determining sensitivities as a function of water saturation in the formation.

Example 14: The method of example 11, wherein generating the updated resistivity model further comprises constraining the updated resistivity model based on mass conservation in a water saturation model of the formation.

Example 15: The method of example 11, wherein the additional data comprises at least one of temperature data, pressure data, microseismic data, well data, and production data.

Example 16: The method of example 11, wherein the operational parameter comprises at least one of a production parameter, a logging parameter, a monitoring parameter, a drilling parameter, and a completion parameter.

Example 17: The method of example 11, further comprising determining a design of the EM monitoring system based on the updated resistivity model.

Example 18: A method of determining a design for an EM monitoring system, comprising:
  obtaining a design for the EM monitoring system;
  obtaining a power budget for the EM monitoring system;
  generating a resistivity model of a subterranean earth formation from data associated with the formation;
  simulating the EM data based on the design, the power budget, and the resistivity model;
  comparing the simulated EM data with a threshold parameter; and
  adjusting at least one of the design, the power budget, and the resistivity model to generate an updated simulation of the EM data.

Example 19: The method of example 18, further comprising determining the design if the simulated EM data satisfies the threshold parameter.

Example 20: The method of example 19, further comprising determining a detection range of the EM monitoring system.

This discussion is directed to various embodiments. The drawing figures are not necessarily to scale. Certain features of the embodiments may be shown exaggerated in scale or in somewhat schematic form and some details of conventional elements may not be shown in the interest of clarity and conciseness. Although one or more of these embodiments may be preferred, the embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to suggest that the scope of the disclosure, including the claims, is limited to that embodiment.

Certain terms are used throughout the description and claims to refer to particular features or components. As one skilled in the art will appreciate, different persons may refer to the same feature or component by different names. This document does not intend to distinguish between components or features that differ in name but not function, unless specifically stated. In the discussion and in the claims, the terms "including" and "comprising" are used in an open-ended fashion, and thus should be interpreted to mean "including, but not limited to . . . ." Also, the term "couple" or "couples" is intended to mean either an indirect or direct connection. In addition, the terms "axial" and "axially" generally mean along or parallel to a central axis (e.g., central axis of a body or a port), while the terms "radial" and "radially" generally mean perpendicular to the central axis. The use of "top," "bottom," "above," "below," and variations of these terms is made for convenience, but does not require any particular orientation of the components.

Reference throughout this specification to "one embodiment," "an embodiment," or similar language means that a particular feature, structure, or characteristic described in connection with the embodiment may be included in at least one embodiment of the present disclosure. Thus, appearances of the phrases "in one embodiment," "in an embodiment," and similar language throughout this specification may, but do not necessarily, all refer to the same embodiment.

Although the present disclosure has been described with respect to specific details, it is not intended that such details should be regarded as limitations on the scope of the disclosure, except to the extent that they are included in the accompanying claims.

What is claimed is:

1. An electromagnetic (EM) monitoring system for a subterranean earth formation, comprising:
   a receiver locatable in a wellbore, responsive to EM radiation propagating through the formation and configured to generate EM data associated with the formation;
   a processor configured to:
      generate a reservoir model of the earth formation based on additional data associated with the formation;
      convert the reservoir model to a resistivity model of the formation;
      generate simulated EM data based on the resistivity model of the formation;
      compare the EM data and the simulated EM data;
      generate an updated resistivity model based on the comparison between the EM data and the simulated EM data; and
      determine an operational parameter based on the updated resistivity model to manage production from a well.

2. The system of claim 1, wherein the EM data comprises an electric field measurement and a magnetic field measurement.

3. The system of claim 1, further comprising a transmitter to generate EM radiation in the formation, wherein the processor is further configured to determine a design of the receiver and transmitter based on the updated resistivity model.

4. The system of claim 3, wherein the design includes at least one of a transmitter type, a transmitter spacing, a receiver type, a receiver spacing, or an operating frequency.

5. The system of claim 1, wherein the processor is further configured to generate the updated resistivity model based on sensitivities of the EM data to water saturation in the formation.

6. The system of claim 1, wherein the processer is further configured to constrain the updated resistivity model based on mass conservation in a water saturation model of the formation.

7. The system of claim 1, wherein the additional data comprises at least one of temperature data, pressure data, microseismic data, well data, production data.

8. The system of claim 1, wherein the processor is further configured to generate the updated operational parameter based on the reservoir model.

9. The system of claim 1, further comprising a multi-zone completion system, wherein the processor is further configured to apply the operational parameter to the multi-zone completion system.

10. The system of claim 1, wherein the operational parameter comprises at least one of a production parameter, a logging parameter, a measurement parameter, a drilling parameter, or a completion parameter.

11. A method of monitoring a subterranean earth formation using an electromagnetic (EM) monitoring system, comprising:
   receiving EM radiation propagating in the formation with a receiver located in a wellbore;
   generating EM data associated with the formation in response to the received EM radiation;
   generating a reservoir model of the formation based on additional data associated with the formation using a processor;
   converting the reservoir model to a resistivity model of the formation;
   generating simulated EM data based on the resistivity model of the formation using the processor;
   comparing the EM data with the simulated EM data;
   generating an updated resistivity model based on the comparison between the EM data and the simulated EM data using the processor; and
   determining an operational parameter based on the updated resistivity model to manage production from a well.

12. The method of claim 11, further comprising measuring an electric field and a magnetic field to generate the EM data.

13. The method of claim 11, wherein generating the updated resistivity model further comprises determining sensitivities as a function of water saturation in the formation.

14. The method of claim 11, wherein generating the updated resistivity model further comprises constraining the updated resistivity model based on mass conservation in a water saturation model of the formation.

15. The method of claim 11, wherein the additional data comprises at least one of temperature data, pressure data, microseismic data, well data, or production data.

16. The method of claim 11, wherein the operational parameter comprises at least one of a production parameter, a logging parameter, a monitoring parameter, a drilling parameter, or a completion parameter.

17. The method of claim 11, further comprising determining a design of the EM monitoring system based on the updated resistivity model.

18. A method of determining a design for an EM monitoring system, comprising:
   obtaining a design for the EM monitoring system;
   obtaining a power budget for the EM monitoring system;
   generating a resistivity model of a subterranean earth formation from data associated with the formation;
   simulating the EM data based on the design, the power budget, and the resistivity model;
   comparing the simulated EM data with a threshold parameter; and
   adjusting at least one of the design or the resistivity model based on the comparison to generate an updated simulation of the EM data.

19. The method of claim 18, further comprising determining the design if the simulated EM data satisfies the threshold parameter.

20. The method of claim 19, further comprising determining a detection range of the EM monitoring system.

* * * * *

UNITED STATES PATENT AND TRADEMARK OFFICE
CERTIFICATE OF CORRECTION

Page 1 of 1

PATENT NO. : 11,016,209 B2
APPLICATION NO. : 16/329560
DATED : May 25, 2021
INVENTOR(S) : Glenn Andrew Wilson, Burkay Donderici and Ahmed Fouda It is certified that error appears in the above-identified patent and that said Letters Patent is hereby corrected as shown below:

In the Claims

Column 17, Line 49, Claim No. 7, Line 3:
"......well data, production data"
Should read:
".....well data, or production data."

Signed and Sealed this
Twenty-seventh Day of July, 2021

Drew Hirshfeld
*Performing the Functions and Duties of the*
*Under Secretary of Commerce for Intellectual Property and*
*Director of the United States Patent and Trademark Office*